US012516924B2

(12) United States Patent
Chauhan et al.

(10) Patent No.: US 12,516,924 B2
(45) Date of Patent: Jan. 6, 2026

(54) METHOD OF PRODUCING A MODEL FOR ESTIMATING FILM THICKNESS OF WORKPIECE, METHOD OF ESTIMATING FILM THICKNESS OF WORKPIECE USING SUCH A MODEL, AND COMPUTER READABLE STORAGE MEDIUM STORING PROGRAM FOR CAUSING COMPUTER TO PERFORM THE METHODS

(71) Applicant: EBARA CORPORATION, Tokyo (JP)

(72) Inventors: Nachiketa Chauhan, Tokyo (JP); Keita Yagi, Tokyo (JP); Akira Nakamura, Tokyo (JP); Rohit Kawde, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 736 days.

(21) Appl. No.: 17/705,910

(22) Filed: Mar. 28, 2022

(65) Prior Publication Data

US 2022/0316863 A1 Oct. 6, 2022

(30) Foreign Application Priority Data

Mar. 31, 2021 (JP) .................................. 2021-060794

(51) Int. Cl.
*G01B 11/06* (2006.01)
(52) U.S. Cl.
CPC .................................. *G01B 11/0633* (2013.01)
(58) Field of Classification Search
CPC ............ G01B 11/0633; G01B 11/0683; G01B 11/0625; H01L 22/12; H01L 22/20; B24B 37/005
See application file for complete search history.

(56) References Cited

U.S. PATENT DOCUMENTS

| 2010/0093260 | A1* | 4/2010 | Kobayashi | ............ | B24B 37/013 |
| | | | | | 451/6 |
| 2011/0275167 | A1* | 11/2011 | David | ..................... | H01L 22/26 |
| | | | | | 257/E21.528 |
| 2011/0281501 | A1* | 11/2011 | Qian | ....................... | B24B 49/12 |
| | | | | | 451/6 |
| 2012/0019830 | A1* | 1/2012 | Kimba | .................... | H01L 22/12 |
| | | | | | 356/445 |
| 2015/0120242 | A1* | 4/2015 | David | .................... | B24B 49/12 |
| | | | | | 702/172 |

(Continued)

FOREIGN PATENT DOCUMENTS

| KR | 2020-0009424 A | 1/2020 |
| KR | 2020-0035894 A | 4/2020 |

(Continued)

*Primary Examiner* — Sang H Nguyen
(74) *Attorney, Agent, or Firm* — BakerHostetler

(57) ABSTRACT

A method of producing a model capable of reducing an influence of spectral variation of reflected light from a workpiece, such as a wafer, and capable of determining an accurate film thickness is disclosed. The method includes: determining sample features representing features of sample spectra of reflected lights from a sample having a film; obtaining similarities by calculating a similarity between each of the sample spectra and a representative spectrum; and producing a film-thickness estimation model by performing machine leaning using training data including the sample features, the similarities, and film thicknesses corresponding to the sample spectra.

8 Claims, 21 Drawing Sheets

(56) References Cited

U.S. PATENT DOCUMENTS

| | | | |
|---|---|---|---|
| 2015/0332943 A1* | 11/2015 | Kobata | B24B 37/013 |
| | | | 156/345.13 |
| 2017/0190020 A1* | 7/2017 | Kobayashi | B24B 49/04 |
| 2019/0244374 A1* | 8/2019 | Benvegnu | H04N 23/10 |
| 2020/0005140 A1* | 1/2020 | Cherian | G06N 3/045 |
| 2020/0094370 A1* | 3/2020 | Cherian | B24B 37/013 |
| 2021/0170544 A1* | 6/2021 | Yagi | B24B 37/013 |
| 2021/0402550 A1* | 12/2021 | Shiokawa | B24B 37/013 |

FOREIGN PATENT DOCUMENTS

| | | |
|---|---|---|
| KR | 2021-0001972 A | 1/2021 |
| WO | WO 2015/163164 A1 | 10/2015 |

\* cited by examiner

METHOD OF PRODUCING A MODEL FOR ESTIMATING FILM THICKNESS OF WORKPIECE, METHOD OF ESTIMATING FILM THICKNESS OF WORKPIECE USING SUCH A MODEL, AND COMPUTER READABLE STORAGE MEDIUM STORING PROGRAM FOR CAUSING COMPUTER TO PERFORM THE METHODS

CROSS REFERENCE TO RELATED APPLICATION

This document claims priority to Japanese Patent Application No. 2021-060794 filed Mar. 31, 2021, the entire contents of which are hereby incorporated by reference.

BACKGROUND

In a process of manufacturing a semiconductor device, various materials are repeatedly formed as films on a silicon wafer to form a multilayer structure. In order to form the multilayer structure, a technique of planarizing a surface of an uppermost layer is important. Chemical mechanical polishing (CMP) is used as such planarization.

Chemical mechanical polishing (CMP) is performed by a polishing apparatus. This type of polishing apparatus generally has a polishing table that supports a polishing pad, a polishing head configured to hold a workpiece (for example, a wafer having a film), and a polishing-liquid supply nozzle configured to supply a polishing liquid (e.g., slurry) onto the polishing pad. When the workpiece is to be polished, the surface of the workpiece is pressed against the polishing pad by the polishing head while the polishing liquid is supplied onto the polishing pad from the polishing-liquid supply nozzle. The polishing head and the polishing table are rotated individually to provide a relative movement between the workpiece and the polishing pad, so that a film forming the surface of the workpiece is polished.

In order to measure a thickness of a non-metal film, such as an insulating film or a silicon layer, the polishing apparatus generally includes an optical film-thickness measuring device. This optical film-thickness measuring device is configured to direct light, emitted by a light source, to the surface of the workpiece and analyze a spectrum of reflected light from the workpiece to determine the film thickness of the workpiece.

FIG. 23 is a diagram illustrating an example of a conventional method of determining a film thickness from the spectrum of the reflected light. The optical film-thickness measuring device measures an intensity of the reflected light from the workpiece with a spectrometer during polishing of the workpiece, and generates a spectrum of the reflected light. The spectrum is expressed as a graph showing a relationship between the intensity of the reflected light and wavelength of the reflected light. The optical film-thickness measuring device compares the spectrum of the reflected light with multiple reference spectra, and determines one reference spectrum having a shape closest to that of the spectrum of the reflected light. Specifically, the optical film-thickness measuring device calculates a difference between the spectrum of the reflected light and each reference spectrum, and determines the reference spectrum having the smallest calculated difference. The optical film-thickness measuring device then determines a film thickness associated with the determined reference spectrum.

Each reference spectrum is associated in advance with a film thickness at which that reference spectrum is obtained. Specifically, reference spectra are obtained at different film thicknesses, and these reference spectra correspond to the different film thicknesses. Therefore, by identifying a reference spectrum that has the closest shape to the spectrum of reflected light, a current film thickness of the workpiece being polished can be estimated.

However, the spectrum obtained during polishing of the workpiece may vary due to various causes. For example, the spectrum of the reflected light obtained during polishing may vary significantly due to a disturbance (slurry, electrical noise, optical noise, etc.), a difference in pattern structure, a difference in structure underlying the film, or the like. Therefore, the film thickness determined from the spectrum may differ significantly from an actual film thickness.

SUMMARY

Therefore, there is provided a method of producing a model capable of reducing an influence of spectral variation of reflected light from a workpiece, such as a wafer, and determining an accurate film thickness. There is further provided a method of estimating a film thickness during polishing of a workpiece using such a model. Further, there is provided a computer-readable storage medium storing a program for causing a computer to perform each method.

Embodiments, which will be described below, relate to a technique of polishing a workpiece, such as a wafer, a substrate, or a panel, used for manufacturing a semiconductor device, and more particularly to a technique of estimating a film thickness of the workpiece using a film-thickness estimation model.

In an embodiment, there is provided a method comprising: determining sample features representing features of sample spectra of reflected lights from a sample having a film; obtaining similarities by calculating a similarity between each of the sample spectra and a representative spectrum, and producing a film-thickness estimation model by performing machine learning using training data including the sample features, the similarities, and film thicknesses corresponding to the sample spectra.

In an embodiment, the representative spectrum is an average spectrum of the sample spectra.

In an embodiment, the method further comprises: before or after determining of the sample features, classifying the sample spectra into classes according to a shape of each sample spectrum; and determining representative spectra for the classes, respectively, wherein obtaining the similarities comprises obtaining similarities by calculating a similarity between each of the sample spectra and each of the representative spectra.

In an embodiment, the representative spectrum is a spectrum of reflected light from a center of the sample.

In an embodiment, each of the sample features includes a numerical value representing a shape of each sample spectrum.

In an embodiment, each of the sample features includes a numerical value representing a shape of a Fourier analysis spectrum obtained by applying a Fourier transform to each sample spectrum.

In an embodiment, the sample spectra are spectra obtained by performing a normalization process on raw spectra of reflected lights from the sample.

In an embodiment, the normalization process is a process of adjusting at least one of tilt and level of each raw spectrum in its entirety.

In an embodiment, there is provided a film thickness estimation method comprising: producing a measurement spectrum of reflected light from a workpiece having a film, while polishing the workpiece; determining a feature of the measurement spectrum; obtaining a similarity by calculating the similarity between the measurement spectrum and a preset representative spectrum; inputting the feature of the measurement spectrum and the similarity into the film-thickness estimation model; and outputting an estimated film thickness of the workpiece from the film-thickness estimation model.

In an embodiment, the preset representative spectrum comprises preset representative spectra, and the similarity comprises similarities between the measurement spectrum and the preset representative spectra.

In an embodiment, there is provided a method comprising: determine sample features representing features of sample spectra of reflected lights from a sample having a film; before or after determining of the sample features, classifying the sample spectra into classes according to a shape of each sample spectrum; producing a classification model by performing machine learning using classification training data including the sample features and class labels each indicating a class to which each sample spectrum belongs; and producing a film-thickness estimation model by performing machine learning using film thickness estimation training data including the sample features, the class labels, and film thicknesses corresponding to the sample spectra.

In an embodiment, each of the sample features includes a numerical value representing shape of each sample spectrum.

In an embodiment, each of the sample features includes a numerical value representing a shape of a Fourier analysis spectrum obtained by applying a Fourier transform to each sample spectrum.

In an embodiment, the sample spectra are spectra obtained by performing a normalization process on raw spectra of reflected lights from the sample.

In an embodiment, the normalization process is a process of adjusting at least one of tilt and level of each raw spectrum in its entirety.

In an embodiment, there is provided a film thickness estimation method comprising: producing a measurement spectrum of reflected light from a workpiece having a film, while polishing the workpiece; determining a feature of the measurement spectrum; inputting the feature of the measurement spectrum into the classification model; outputting confidence scores from the classification model, the confidence scores indicating a class to which the measurement spectrum belongs; inputting the feature of the measurement spectrum and the confidence scores into the film-thickness estimation model; and outputting an estimated film thickness of the workpiece from the film-thickness estimation model.

In an embodiment, there is provided a computer-readable storage medium that stores a program configured to cause a computer to perform the steps of: determining sample features representing features of sample spectra of reflected lights from a sample having a film; obtaining similarities by calculating a similarity between each of the sample spectra and a representative spectrum; and producing a film-thickness estimation model by performing machine learning using training data including the sample features, the similarities, and film thicknesses corresponding to the sample spectra.

In an embodiment, the program is configured to cause the computer to further perform the steps of: before or after determining of the sample features, classifying the sample spectra into classes according to a shape of each sample spectrum; and determining representative spectra for the classes, respectively, wherein obtaining the similarities comprises obtaining similarities by calculating a similarity between each of the sample spectra and each of the representative spectra.

In an embodiment, there is provided a computer-readable storage medium that stores a program configured to cause a computer to perform the steps of: producing a measurement spectrum of reflected light from a workpiece having a film; determining a feature of the measurement spectrum; obtaining a similarity by calculating the similarity between the measurement spectrum and a preset representative spectrum; inputting the feature of the measurement spectrum and the similarity into the film-thickness estimation model; and outputting an estimated film thickness of the workpiece from the film-thickness estimation model.

In an embodiment, the preset representative spectrum comprises preset representative spectra, and the similarity comprises similarities between the measurement spectrum and the preset representative spectra.

In an embodiment, there is provided a computer-readable storage medium that stores a program configured to cause a computer to perform the steps of: determine sample features representing features of sample spectra of reflected lights from a sample having a film; before or after determining of the sample features, classifying the sample spectra into classes according to a shape of each sample spectrum; producing a classification model by performing machine learning using classification training data including the sample features and class labels each indicating a class to which each sample spectrum belongs; and producing a film-thickness estimation model by performing machine learning using film thickness estimation training data including the sample features, the class labels, and film thicknesses corresponding to the sample spectra.

In an embodiment, there is provided a computer-readable storage medium that stores a program configured to cause a computer to perform the steps of: producing a measurement spectrum of reflected light from a workpiece having a film; determining a feature of the measurement spectrum; inputting the feature of the measurement spectrum into the classification model; outputting confidence scores from the classification model, the confidence scores indicating a class to which the measurement spectrum belongs; inputting the feature of the measurement spectrum and the confidence scores into the film-thickness estimation model; and outputting an estimated film thickness of the workpiece from the film-thickness estimation model.

According to the above-described embodiments, the model capable of determining an accurate film thickness can be produced.

DESCRIPTION OF EMBODIMENTS

The above-described embodiments will be described below with reference to the drawings.

Figure 1:
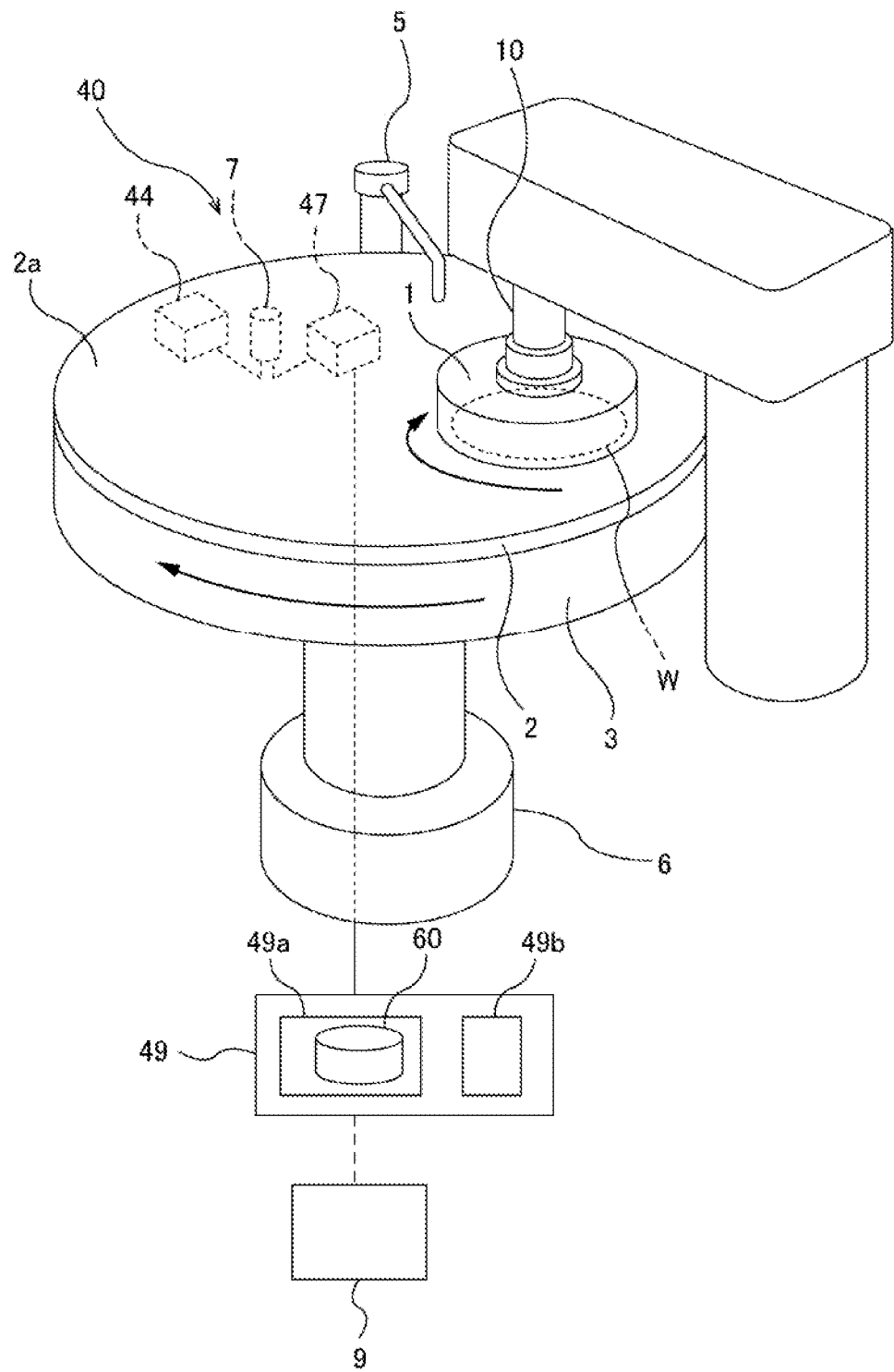
FIG. 1 is a schematic view showing an embodiment of a polishing apparatus.

FIG. 1 is schematic view showing an embodiment of a polishing apparatus. As shown in FIG. 1, the polishing apparatus includes a polishing table 3 for supporting a polishing pad 2, a polishing head 1 configured to press a workpiece W, such as a wafer for use in manufacturing of semiconductor device, against the polishing pad 2, a table motor 6 configured to rotate the polishing table 3, and a polishing-liquid supply nozzle 5 configured to supply a polishing liquid (e.g., slurry) onto the polishing pad 2. The polishing pad 2 has an upper surface constituting a polishing surface 2a for polishing the workpiece W.

The polishing head 1 is coupled to a head shaft 10, which is coupled to a polishing-head motor (now shown). The polishing-head motor is configured to rotate the polishing head 1 together with the head shaft 10 in a direction indicated by an arrow. The polishing table 3 is coupled to the table motor 6, which is configured to rotate the polishing table 3 and the polishing pad 2 in a direction indicated by an arrow.

Polishing of the workpiece W is performed as follows. The polishing-liquid supply nozzle 5 supplies the polishing liquid onto the polishing surface 2a of the polishing pad 2 on the polishing table 3, while the polishing table 3 and the polishing head 1 are rotated in directions indicated by the arrows in FIG. 1. While the workpiece W is being rotated by the polishing head 1, the workpiece W is pressed by the polishing head 1 against the polishing surface 2a of the polishing pad 2 in the presence of the polishing liquid on the polishing pad 2. The surface of the workpiece W is polished by a chemical action of the polishing liquid and a mechanical action of abrasive grains contained in the polishing liquid and/or the polishing pad 2.

The polishing apparatus includes an optical film-thickness measuring device 40 configured to determine a film thickness of the workpiece W. The optical film-thickness measuring device 40 includes a light source 44 for emitting light, a spectrometer 47, an optical sensor head 7 coupled to the light source 44 and the spectrometer 47, and a processing system 49 coupled to the spectrometer 47. The optical sensor head 7, the light source 44, and the spectrometer 47 are secured to the polishing table 3, and rotate together with the polishing table 3 and the polishing pad 2. The position of the optical sensor head 7 is such that the optical sensor head 7 sweeps across the surface of the workpiece W on the polishing pad 2 each time the polishing table 3 and the polishing pad 2 make one rotation.

The processing system 49 includes a memory 49a storing programs therein for producing a spectrum, producing various models (e.g., a film-thickness estimation model, a classification model), and estimating a film thickness of the workpiece W, which will be described later, and an arithmetic device 49b for performing arithmetic operations according to instructions included in the programs. The processing system 49 is composed of at least one computer. The memory 49a includes a main memory, such as RAM, and an auxiliary memory, such as a hard disk drive (HDD) or a solid-state drive (SSD). Examples of the arithmetic device 49b include a CPU (central processing unit) and a GPU (graphic processing unit). However, the specific configurations of the processing system 49 are not limited to these examples.

The processing system 49 is composed of at least one computer. The at least one computer may be one server or a plurality of servers. The processing system 49 may be an edge server coupled to the spectrometer 47 by a communication line, or may be a cloud server or a fog server coupled to the spectrometer 47 by a communication network, such as the Internet or a local area network. The processing system 49 may be arranged in a gateway, a router, or the like.

The processing system 49 may be a plurality of servers coupled by a communication network, such as the Internet or a local area network. For example, the processing system 49 may be a combination of an edge server and a cloud server. In one embodiment, the memory 49*a* may be provided in a server (not shown) located away from the arithmetic device 49*b*.

The light emitted by the light source 44 is transmitted to the optical sensor head 7 and directed from the optical sensor head 7 to the surface of the workpiece W. The light is reflected off the surface of the workpiece W, and the reflected light from the surface of the workpiece W is received by the optical sensor head 7 and transmitted to the spectrometer 47. The spectrometer 47 decomposes the reflected light according to wavelengths and measures the intensity of the reflected light at each of the wavelengths. The intensity measurement data of the reflected light is sent to the processing system 49.

The processing system 49 is configured to produce a spectrum of the reflected light from the intensity measurement data of the reflected light. The spectrum of the reflected light is expressed as a line graph (i.e., a spectral waveform) showing a relationship between the wavelength and the intensity of the reflected light. The intensity of the reflected light can be expressed as a relative value, such as reflectance or relative reflectance.

Figure 2:
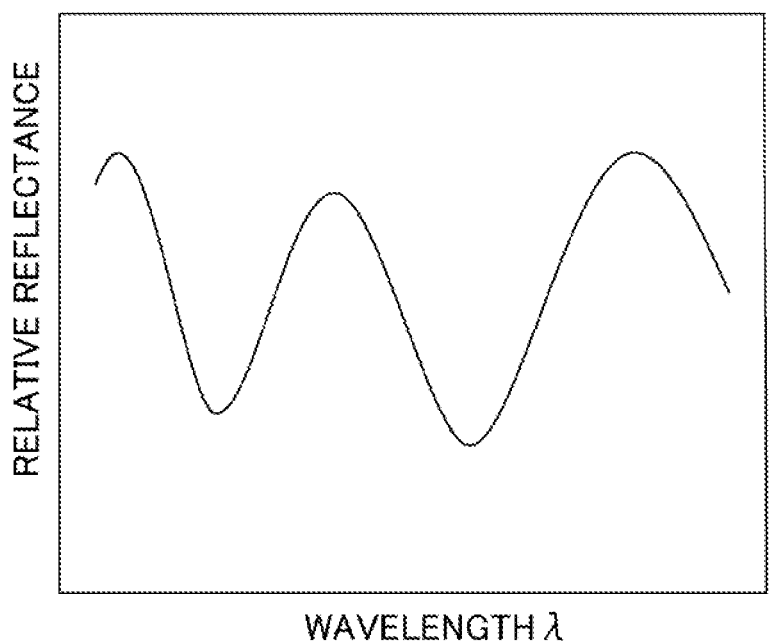
FIG. 2 is a diagram showing a spectrum generated by a processing system.

FIG. 2 is a diagram showing an example of a spectrum created by the processing system 49. The spectrum is represented as a line graph (i.e., a spectral waveform) showing the relationship between the wavelength and intensity of light. In FIG. 2, horizontal axis represents wavelength of the light reflected from the workpiece, and vertical axis represents relative reflectance derived from the intensity of the reflected light. The relative reflectance is an index value that represents the intensity of the reflected light. Specifically, the relative reflectance is a ratio of the intensity of the light to a predetermined reference intensity. By dividing the intensity of the light (i.e., the actually measured intensity) at each wavelength by a predetermined reference intensity, unwanted noises, such as a variation in the intensity inherent in an optical system or the light source of the apparatus, are removed from the actually measured intensity.

The reference intensity is an intensity that has been measured in advance at each of the wavelengths. The relative reflectance is calculated at each of the wavelengths. Specifically, the relative reflectance is determined by dividing the intensity of the light (the actually measured intensity) at each wavelength by the corresponding reference intensity. The reference intensity is, for example, obtained by directly measuring the intensity of light emitted from the optical sensor head 7, or by irradiating a mirror with light from the optical sensor head 7 and measuring the intensity of reflected light from the mirror. Alternatively, the reference intensity may be an intensity of the reflected light which is measured by the spectrometer 47 when a silicon substrate (bare substrate) with no film thereon is being water-polished in the presence of water on the polishing pad 2, or when the silicon substrate (bare substrate) is placed on the polishing pad 2.

In the actual polishing process, a dark level (which is a background intensity obtained under the condition that light is cut off) is subtracted from the actually measured intensity to determine a corrected actually measured intensity. Further, the dark level is subtracted from the reference intensity to determine a corrected reference intensity. Then the relative reflectance is calculated by dividing the corrected actually measured intensity by the corrected reference intensity. Specifically, the relative reflectance R(λ) can be calculated by using the following formula (1)

$$R(\lambda) = \frac{E(\lambda) - D(\lambda)}{B(\lambda) - D(\lambda)} \quad (1)$$

where λ is wavelength, E(λ) is the intensity of the light reflected from the wafer at the wavelength λ, B(λ) is the reference intensity at the wavelength λ, and D(λ) is the background intensity (i.e., dark level) at the wavelength λ obtained under the condition that light is cut off.

Each time the polishing table 3 makes one rotation, the optical sensor head 7 directs the light to predetermined measurement points on the workpiece W and receives the reflected light from the predetermined measurement points. The predetermined measurement points on the workpiece W include a central point of the workpiece W. The reflected light is transmitted to the spectrometer 47. The spectrometer 47 decomposes the reflected light according to its wavelengths and measures the intensity of the reflected light at each of the wavelengths. The intensity measurement data of the reflected light is sent to the processing system 49. In the example shown in FIG. 2, the spectrum of the reflected light is a spectral waveform showing the relationship between the relative reflectance and the wavelength of the reflected light. The spectrum of the reflected light may be a spectral waveform showing a relationship between the intensity itself of the reflected light and the wavelength of the reflected light.

Further, as will be described later, the processing system 49 receives the intensity measurement data of the reflected light returned from each predetermined measurement point while the polishing table 3 makes one rotation, and produces a spectrum from the intensity measurement data. The processing system 49 is configured to estimate (or determine) the film thickness of the workpiece W from the spectrum.

As shown in FIG. 1, the processing system 49 is coupled to a polishing controller 9 for controlling a polishing operation for the workpiece W. The polishing controller 9 controls the polishing operation for the workpiece W based on the film thickness of the workpiece W determined by the processing system 49. For example, the polishing controller 9 is configured to determine a polishing end point at which the film thickness of the workpiece W reaches a target film thickness, or change polishing conditions of the workpiece W when the film thickness of the workpiece W reaches a predetermined value.

Figure 3:
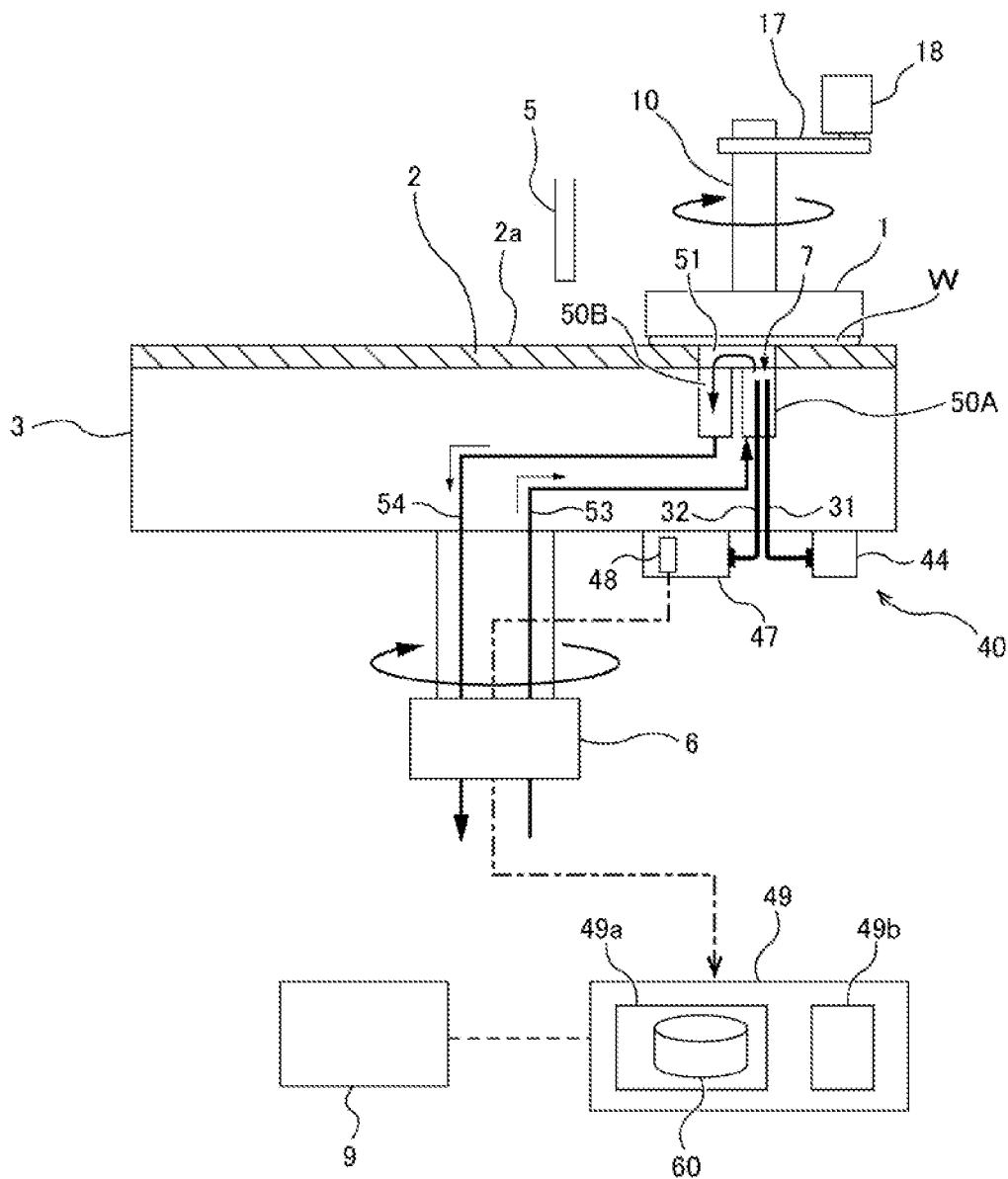
FIG. 3 is a cross-sectional view showing an embodiment of a detailed configuration of the polishing apparatus shown in FIG. 1.

FIG. 3 is a cross-sectional view showing an embodiment of detailed configurations of the polishing apparatus shown in FIG. 1. The head shaft 10 is coupled to a polishing-head motor 18 via a coupling device 17, such as belt, so that the head shaft 10 is rotated by the polishing-head motor 18. This rotation of the head shaft 10 is transmitted to the polishing head 1 to rotate the polishing head 1 in the direction indicated by the arrow.

The spectrometer 47 includes a light detector 48. In one embodiment, the light detector 48 is constituted by photodiode, CCD, or CMOS. The optical sensor head 7 is optically coupled to the light source 44 and the light detector 48. The light detector 48 is electrically coupled to the processing system 49.

The optical film-thickness measuring device 40 includes a light-emitting optical fiber cable 31 arranged to direct the light, emitted by the light source 44, to the surface of the workpiece W, and a light-receiving optical fiber cable 32 arranged to receive the reflected light from the workpiece W and transmit the reflected light to the spectrometer 47. An end of the light-emitting optical fiber cable 31 and an end of the light-receiving optical fiber cable 32 are located in the polishing table 3.

The end of the light-emitting optical fiber cable 31 and the end of the light-receiving optical fiber cable 32 constitute the optical sensor head 7 that directs the light to the surface of the workpiece W and receives the reflected light from the workpiece W. The other end of the light-emitting optical fiber cable 31 is coupled to the light source 44, and the other end of the light-receiving optical fiber cable 32 is coupled to the spectrometer 47. The spectrometer 47 is configured to decompose the reflected light from the workpiece W according to wavelengths and measure intensities of the reflected light over a predetermined wavelength range.

The light source 44 transmits the light to the optical sensor head 7 through the light-emitting optical fiber cable 31, and the optical sensor head 7 emits the light to the workpiece W. The reflected light from the workpiece W is received by the optical sensor head 7 and transmitted to the spectrometer 47 through the light-receiving optical fiber cable 32. The spectrometer 47 decomposes the reflected light according to its wavelengths and measures the intensity of the reflected light at each of the wavelengths. The spectrometer 47 sends the intensity measurement data of the reflected light to the processing system 49. The processing system 49 produces the spectrum of the reflected light from the intensity measurement data of the reflected light.

The polishing table 3 has a first hole 50A and a second hole 50B which open in an upper surface of the polishing table 3. The polishing pad 2 has a through-hole 51 at a position corresponding to the holes 50A and 50B. The holes 50A and 50B are in fluid communication with the through-hole 51, which opens in the polishing surface 2a. The first hole 50A is coupled to a liquid supply line 53. The second hole 50B is coupled to a drain line 54. The optical sensor head 7, composed of the end of the light-emitting optical fiber cable 31 and the end of the light-receiving optical fiber cable 32, is located in the first hole 50A, and is located below the through-hole 51.

During the polishing of the workpiece W, pure water as a rinsing liquid is supplied into the first hole 50A through the liquid supply line 53, and further supplied into the through-hole 51 through the first hole 50A. The pure water fills a space between the surface (i.e., the surface to be polished) of the workpiece W and the optical sensor head 7. The pure water flows into the second hole 50B and is discharged through the drain line 54. The pure water flowing in the first hole 50A and the through-hole 51 prevents the polishing liquid from entering the first hole 50A, thereby ensuring an optical path.

The light-emitting optical fiber cable 31 is an optical transmission element for transmitting the light, emitted by the light source 44, to the surface of the workpiece W. The distal ends of the light-emitting optical fiber cable 31 and the light-receiving optical fiber cable 32 lie in the first hole 50A, and are located near the surface, to be polished, of the workpiece W. The optical sensor head 7, composed of the distal end of the light-emitting optical fiber cable 31 and the distal end of the light-receiving optical fiber cable 32, is arranged so as to face the workpiece W held by the polishing head 1, so that multiple measurement points of the workpiece W are irradiated with the light each time the polishing table 3 makes one revolution. Only one optical sensor head 7 is provided in the polishing table 3 in this embodiment, while a plurality of optical sensor heads 7 may be provided m the polishing table 3.

Figure 4:
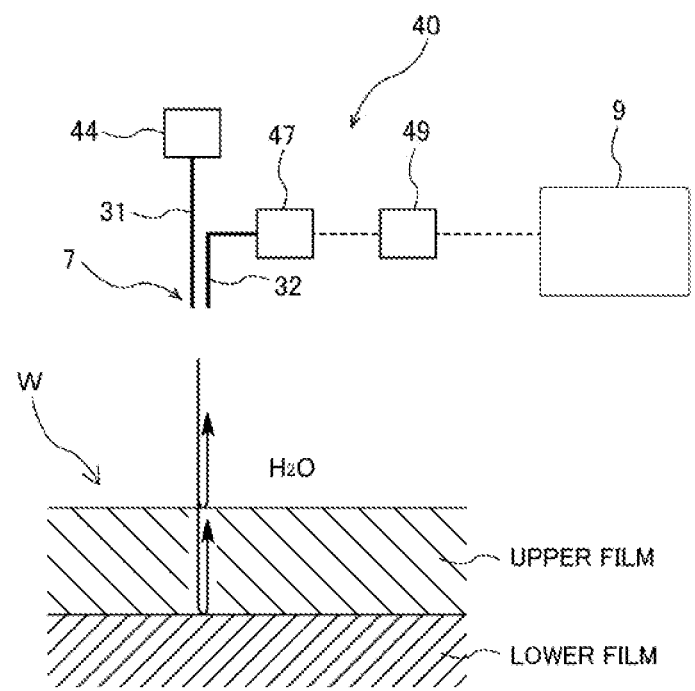
FIG. 4 is a schematic view illustrating a principle of an optical film-thickness measuring device.
Figure 5:
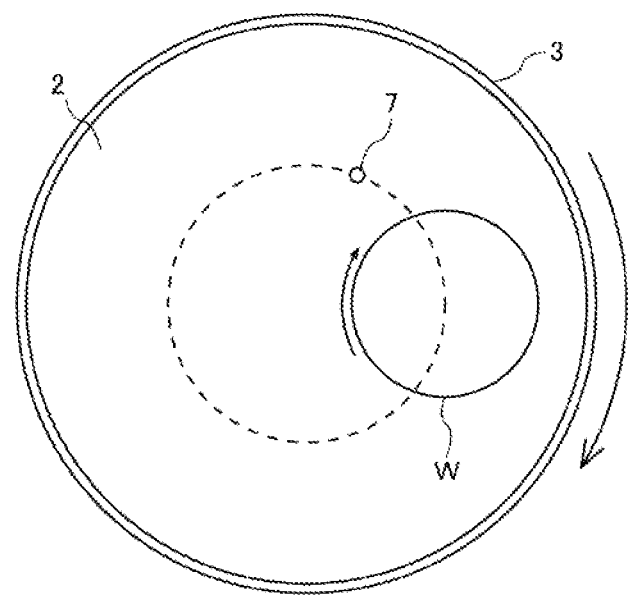
FIG. 5 is a plan view showing a positional relationship between a workpiece and a polishing table.
Figure 6:
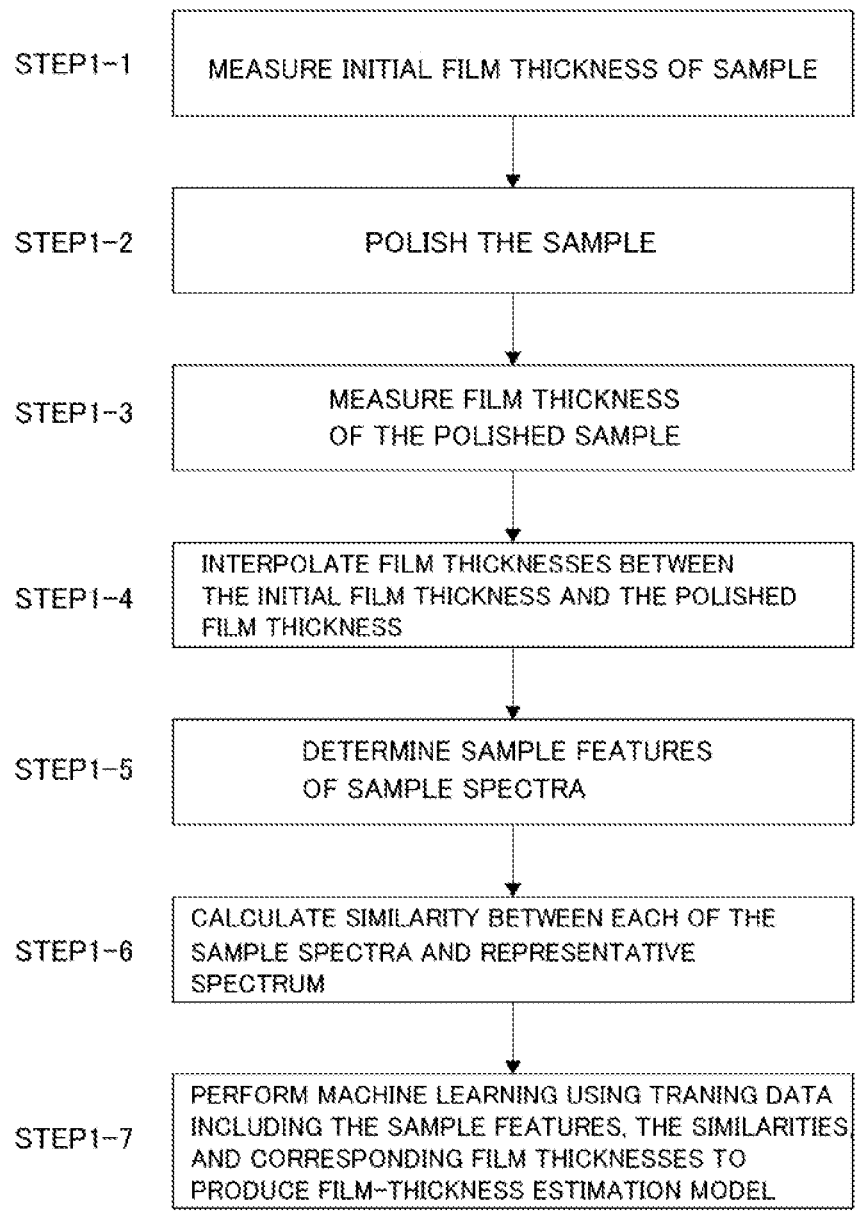
FIG. 6 is a flowchart illustrating an embodiment of a method of producing a film-thickness estimation model.

FIG. 4 is a schematic view illustrating the principle of the optical film-thickness measuring device 40, and FIG. 6 is a plan view showing a positional relationship between the workpiece W and the polishing table 3. In this example shown in FIG. 5, the workpiece W has a lower film and an upper film formed on the lower film. The upper film is, for example, a silicon layer or a dielectric film. The optical sensor heard 7, which is composed of the distal ends of the light-emitting optical fiber cable 31 and the light-receiving optical fiber cable 32, is oriented toward the surface of the workpiece W. The optical sensor heard 7 is arranged so as to direct the light to multiple measurement points, including the center, of the workpiece W each time the polishing table 3 makes one revolution.

The light, which is cast on the workpiece W, is reflected off an interface between a medium (e.g., water in the example of FIG. 4) and the upper film and an interface between the upper film and the lower film. Light waves from these interfaces interfere with each other. The manner of interference between the light waves vanes according to the thickness of the upper film (i.e., a length of an optical path). As a result, the spectrum, produced from the reflected light from the workpiece W, varies according to the thickness of the upper film.

During polishing of the workpiece W, each time the polishing table 3 makes one revolution, the optical sensor head 7 sweeps across the workpiece W. While the optical sensor head 7 is located below the workpiece W, the light source 44 emits the light. The light is directed to the surface (i.e., the surface to be polished) of the workpiece W and the reflected light from the workpiece W is received by the optical sensor head 7 and is transmitted to the spectrometer 47. The spectrometer 47 measures the intensity of the reflected light at each of the wavelengths over the predetermined wavelength range and sends the intensity measurement data of the reflected light to the processing system 49. The processing system 49 produces, from the intensity measurement data, a spectrum of the reflected light indicating the light intensities at the respective wavelengths.

The film thickness at a measurement point on the workpiece W is calculated by inputting a spectrum of the reflected light from that measurement point into a film-thickness estimation model. Specifically, the processing system 49 inputs the spectrum of the reflected light from a certain measurement point on the workpiece W into the film-thickness estimation model, and calculates an estimated film thickness at that measurement point according to algorithm of the film-thickness estimation model.

A method of producing the film-thickness estimation model will now be described. In producing of the film-thickness estimation model, a sample of the same type as the workpiece W is used. For example, if the workpiece W is a wafer, a sample to be used is also a wafer. In another example, if the workpiece W is a panel, a sample to be used is also a panel.

Like the workpiece W, the sample has a film on its surface. The sample is polished by the polishing apparatus shown in FIG. 1, and the processing system 49 generates a plurality of spectra of reflected lights from the sample (hereinafter referred to as sample spectra). The generation of the sample spectra is performed in the same manner as the generation of the spectrum of the reflected light from the workpiece W described with reference to FIGS. 1 to 5.

As shown in FIG. 1, the memory 49a of the processing system 49 has a database 60 containing data of sample spectra. These sample spectra are spectra of reflected lights from a plurality of samples obtained in the past.

FIG. 6 is a flowchart illustrating an embodiment of a method of producing the film-thickness estimation model.

In step 1-1, an initial film thickness of a sample having a film is measured by a film-thickness measuring device (not shown). The initial film thickness of the sample is a film thickness before the sample is polished. The film-thickness measuring device is a so-called stand-alone type film-thickness measuring device, and is configured to be able to measure the film thickness of the sample with high accuracy. Configuration and type of the film-thickness measuring device are not particularly limited. For example, the film-thickness measuring device may be an optical film-thickness measuring device configured to measure a film thickness of a sample in a stationary state.

In step 1-2, the sample is transported to the polishing apparatus shown in FIG. 1, and the sample is polished at a constant polishing rate by the polishing apparatus. The polishing rate is an amount of decrease in the thickness of the film per unit time, and is also called a removal rate. During polishing of the sample, the processing system 49 produces spectra of reflected lights from the sample. Specifically, each time the polishing table 3 makes one rotation, the light source 44 emits the light to the sample on the polishing pad 2 via the optical sensor head 7, the optical sensor head 7 receives the reflected light from the sample, and the optical sensor head 7 transmits the reflected light to the spectrometer 47. The spectrometer 47 decomposes the reflected light from the sample according to wavelengths and measures the intensity of the reflected light at each of the wavelengths. The intensity measurement data of the reflected light is sent to the processing system 49. The processing system 49 produces a spectrum of the reflected light (i.e., a sample spectrum) from the intensity measurement data of the reflected light. The processing system 49 stores multiple sample spectra obtained during the polishing of the sample in the memory 49a.

In step 1-3, after polishing of the sample is terminated, the polished sample is conveyed to the above-described film-thickness measuring device, and a film thickness of the polished sample is measured by the film-thickness measuring device.

In step 1-4, the processing system 49 obtains the initial film thickness of the sample measured in the step 1-1 and the film thickness of the polished sample measured in the step 1-3 from the film-thickness measuring device. Further, the processing system 49 interpolates film thicknesses corresponding to the sample spectra generated in the step 1-2 from the initial film thickness of the sample and the film thickness of the polished sample, and determines multiple film thicknesses corresponding to the multiple sample spectra, respectively.

Figure 7:
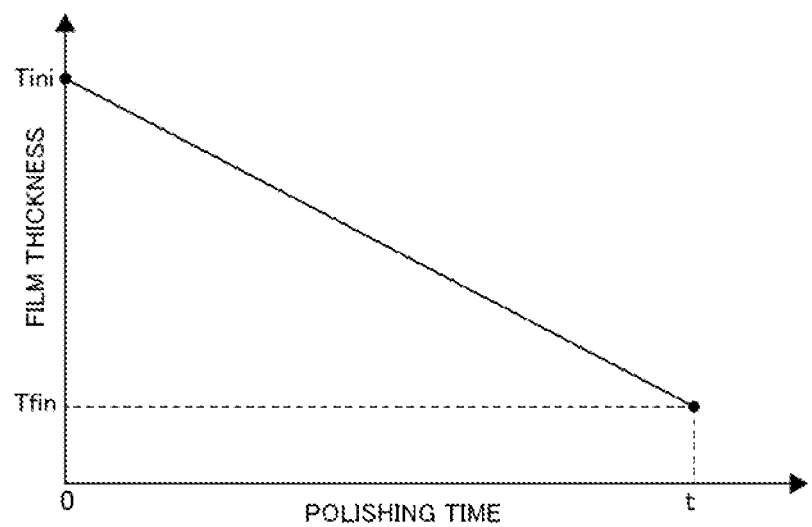
FIG. 7 is a graph showing a relationship between film thickness of a sample and polishing time.

The above step 1-4 will be described in detail with reference to FIG. 7. FIG. 7 is a graph showing a relationship between film thickness of the sample and polishing time. When the polishing rate of the sample is constant, the film thickness decreases linearly from an initial film thickness Tini to a polished film thickness Tfin with the polishing time, as shown in FIG. 7. Therefore, film thicknesses between the initial film thickness Tini and the polished film thickness Tfin can be calculated by the interpolation.

As described above, the sample spectrum is periodically obtained each time the polishing table 3 makes one rotation. Therefore, by assigning the sample spectra obtained during the polishing of the sample to the film thicknesses from the initial film thickness Tini to the polished film thickness Tfin, film thicknesses corresponding to the sample spectra (i.e., multiple film thicknesses from the initial film thickness Tini to the polished film thickness Tfin) can be determined. In this way, each sample spectrum is associated with (or linked) to a corresponding film thickness.

Figure 8:
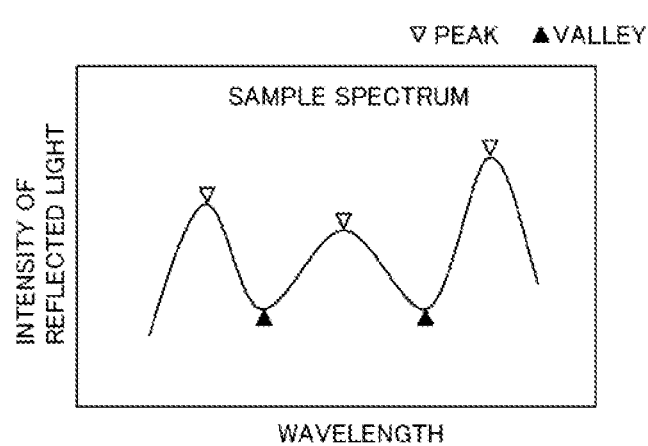
FIG. 8 is a diagram illustrating a sample feature containing a set of numerical values indicating positions of peaks and valleys in a sample spectrum.

Referring back to FIG. 6, in step 1-5, the processing system 49 determines sample features representing features of the sample spectra. Each sample feature is a set of numerical values representing a shape of each sample spectrum. For example, as shown in FIG. 8, the sample feature is a set of numerical values indicating positions of peaks and valleys in the sample spectrum. As described with reference to FIG. 4, the shape of the sample spectrum varies depending on the film thickness of the sample. Therefore, the positions of the peaks and valleys in the sample spectrum also change depending on the film thickness of the sample. Therefore, the positions of the peaks and valleys in the sample spectrum can be used as the feature of the sample spectrum. The positions of the peaks and valleys in the sample spectrum can be specified from intensities and wavelengths of the sample spectrum.

Figure 9:
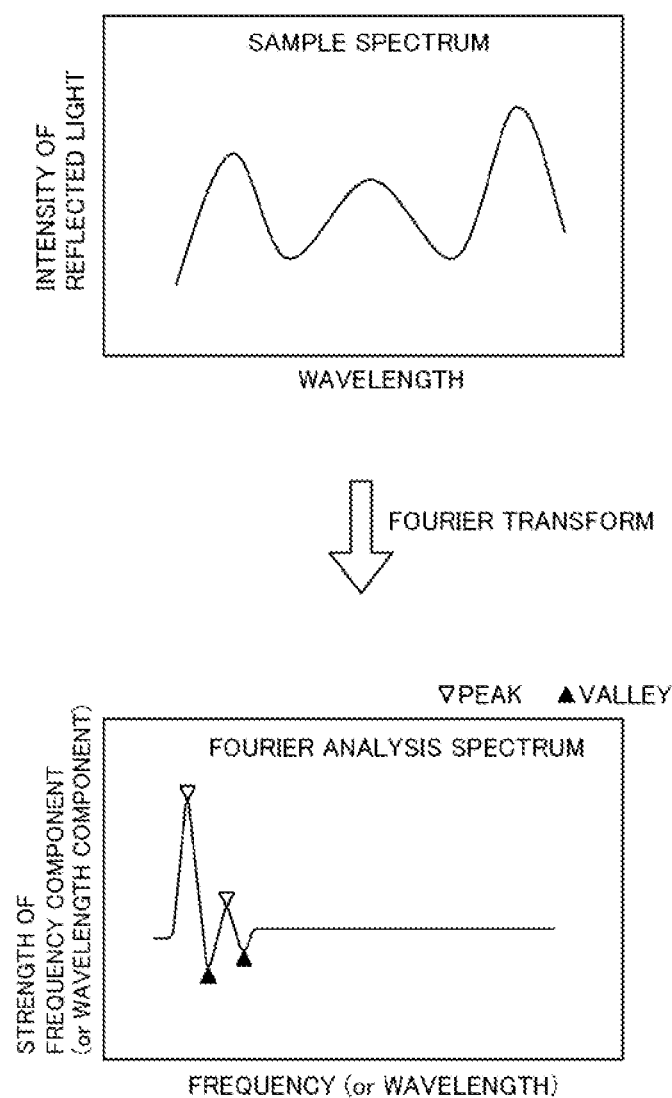
FIG. 9 is a diagram illustrating a sample feature containing a set of numerical values indicating positions of peaks and valleys in a Fourier analysis spectrum.

In another example, the sample feature may be a set of numerical values representing a shape of a Fourier analysis spectrum obtained by applying a Fourier transform to the sample spectrum. For example, the sample feature may be a set of numerical values indicating positions of peaks and valleys in the Fourier analysis spectrum. More specifically, as shown in FIG. 9, the processing system 49 performs a Fourier transform (e.g., a Fast Fourier Transform, FFT) on each sample spectrum to produce a Fourier analysis spectrum. In one example, the Fourier analysis spectrum is a frequency spectrum showing a relationship between frequency contained in the sample spectrum and strength of frequency component. In another example, frequencies contained in the sample spectrum may be converted to wavelengths. In this case, the Fourier analysis spectrum is a wavelength spectrum showing a relationship between the wavelength converted from the frequency contained in the sample spectrum and strength of wavelength component.

As can be seen from FIG. 9, the Fourier analysis spectrum has peaks and valleys as well as the sample spectrum. The positions of these peaks and valleys vary depending on the shape of the sample spectrum (i.e., film thickness). Therefore, the positions of the peaks and valleys of the Fourier analysis spectrum can be used as the feature of the sample spectrum.

Referring back to FIG. 6, in step 1-6, the processing system 49 obtains similarities by calculating a similarity between each of the sample spectra and a representative spectrum. The representative spectrum is a spectrum that serves as a reference for a spectrum shape. The representative spectrum is, for example, a typical spectrum of reflected light from an arbitrary semiconductor structure. The representative spectrum is determined before the calculation of the similarity. The determined representative spectrum is stored in the memory 49a. In one example, the representative spectrum may be an average spectrum of the sample spectra. In another example, the representative spectrum may be a spectrum of reflected light from the center of the sample. In yet another example, the representative spectrum may be an arbitrary spectrum selected from spectra of reflected lights from the center of the sample, or an average spectrum of spectra of reflected lights from the center of the sample. Each time the polishing table 3 makes one rotation, the light is directed to the center of the sample and the reflected light from the center of the sample is obtained. Therefore, the spectra of the reflected lights from the center of the sample can be stably obtained. In yet another example, the representative spectrum may be an arbitrary one selected from the sample spectra, or may be a theoretical spectrum theoretically calculated from a film structure.

Figure 10:
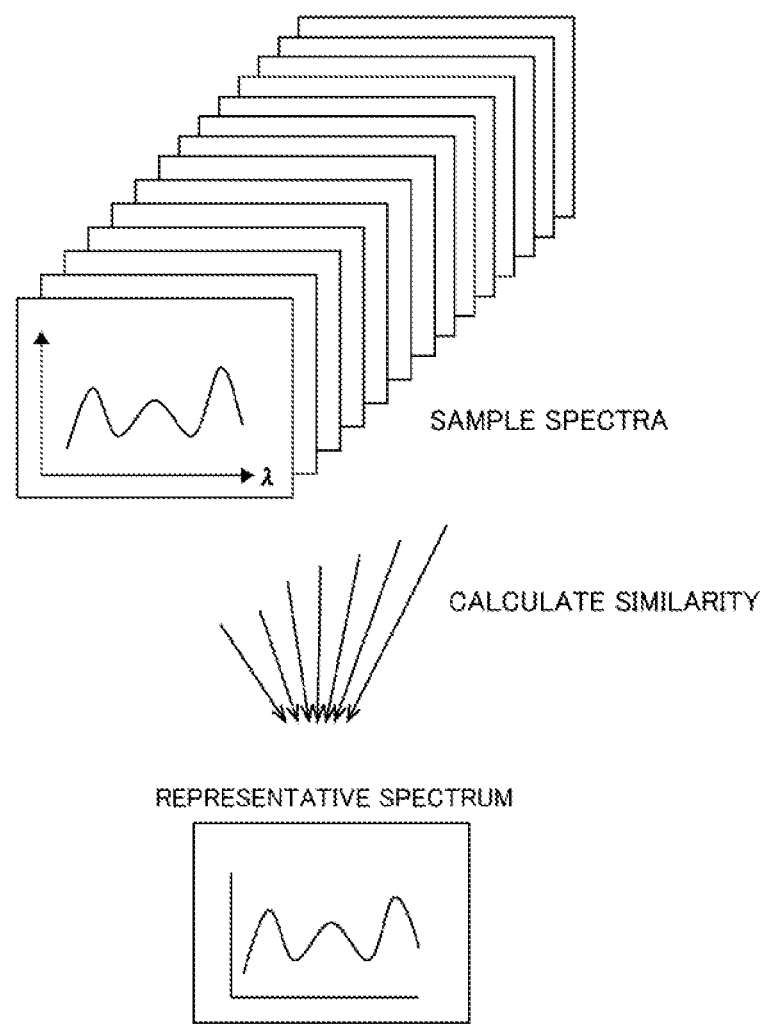
FIG. 10 is a schematic diagram for explaining a step of calculating similarity.

FIG. 10 is a schematic diagram for explaining the step 1-6 for calculating the similarities. The processing system 49 calculates the similarities between the sample spectra stored in the memory 49a and the representative spectrum. Each similarity is a degree of similarity in shape between spectra. Specifically, when shapes of a sample spectrum and the representative spectrum are similar, a high similarity is calculated. On the other hand, if a sample spectrum has a shape that is significantly different from that of the representative spectrum, a low similarity is calculated.

An algorithm for calculating the similarity is not particularly limited. A known algorithm can be used for calculating the similarity. Examples of the similarity include cosine similarity, correlation coefficient, Euclidean distance, standard Euclidean distance, Mahalanobis distance, Manhattan distance, a combination thereof, and a combination of standardized or normalized values of these variables.

Referring back to FIG. 6, in step 1-7, the processing system 49 performs machine learning to create the film-thickness estimation model using training data including the sample features determined in the step 1-5, the similarities calculated in the step 1-6, and the film thicknesses corresponding respectively to the sample spectra determined in the step 1-4.

Examples of the machine learning algorithm include a support vector regression method, a deep learning method, a random forest method, and a decision tree method. In this embodiment, the deep learning method, which is an example of machine learning, is used. The deep learning method is a learning method based on a neural network having multiple intermediate layers (also referred to as hidden layers). In this specification, machine learning using a neural network containing an input layer, two or more intermediate layers, and an output layer is referred to as deep learning.

The film-thickness estimation model is composed of a neural network. The memory 49a of the processing system 49 stores a program for producing or constructing the film-thickness estimation model according to the machine learning algorithm. The arithmetic device 49b of the processing system 49 produces the film-thickness estimation model by performing arithmetic operations according to instructions included in the program. Producing the film-thickness estimation model by the machine learning involves optimizing parameters, such as weights, of the neural network.

The film-thickness estimation model is produced by the machine learning using the training data including the sample features, the similarities, and the corresponding film thicknesses, as discussed above. More specifically, in the producing of the film-thickness estimation model, the sample features and the similarities contained in the training data are used as explanatory variables, and the corresponding film thicknesses contained in the training data are used as objective variables (i.e., correct labels). Specifically, the processing system 49 inputs each sample feature and each similarity to the input layer of the film-thickness estimation model, and adjusts the parameters (weights, bias, etc.) of the film-thickness estimation model such that the output layer of the film-thickness estimation model outputs a film thickness corresponding to the input sample feature and similarity. As a result of such machine learning, the film-thickness estimation model as a trained model is constructed. The film-thickness estimation model is stored in the memory 49a of the processing system 49.

In order to improve the accuracy of the film-thickness estimation model, it is preferable to prepare a large number of sample features, similarities, and corresponding film thicknesses. Therefore, multiple samples are prepared, and the steps 1-1 to 1-6 shown in FIG. 6 are repeated, so that a large number of sample features, similarities, and corresponding film thicknesses are obtained. The training data containing the combination of the sample features, the similarities, and the corresponding film thicknesses provided as discussed above is stored in the database 60 of the memory 49a.

Figure 11:
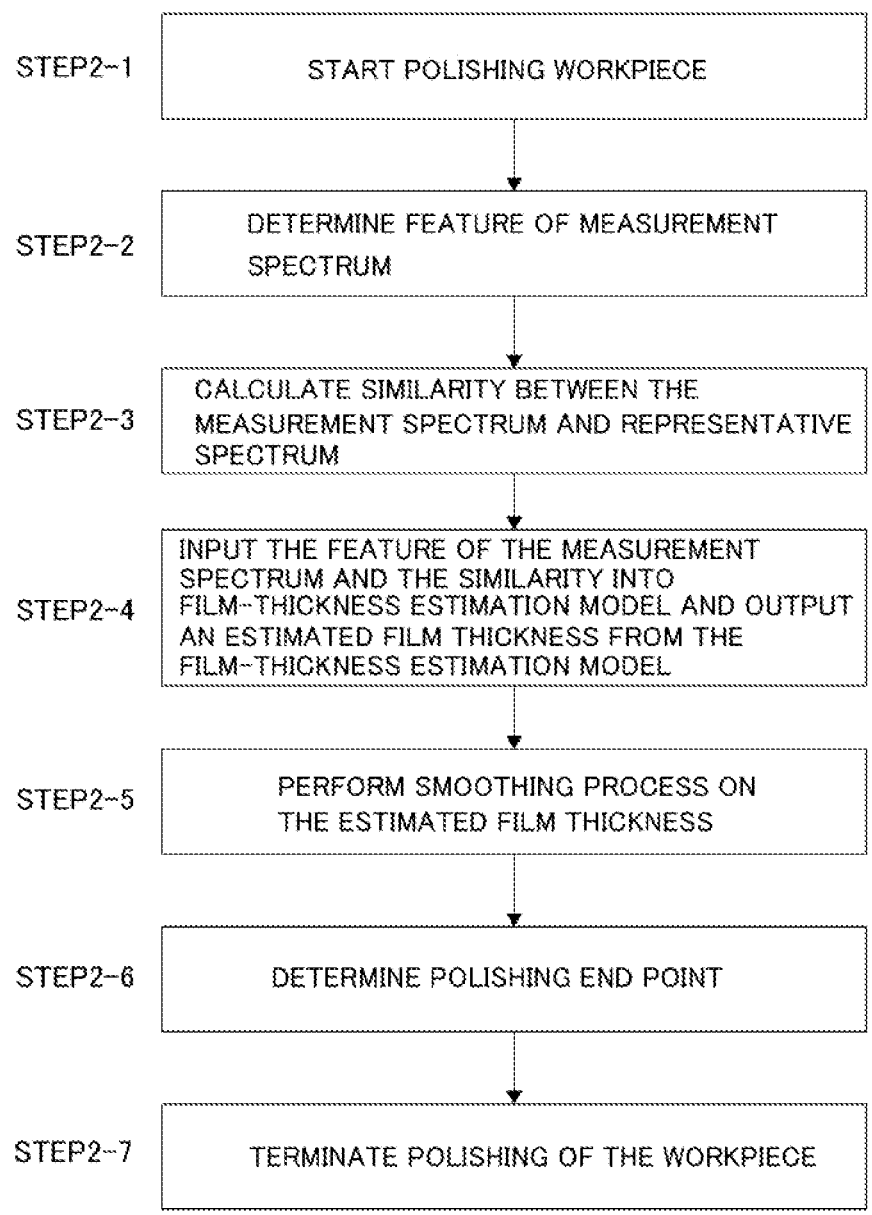
FIG. 11 is a flowchart illustrating an embodiment in which a film thickness of a workpiece is estimated during polishing of the workpiece using the film-thickness estimation model.

Next, an embodiment of estimating a film thickness of the workpiece W during polishing of the workpiece W using the film-thickness estimation model produced as described above will be described with reference to a flowchart of FIG. 11.

In step 2-1, the workpiece W is transported to the polishing apparatus shown in FIG. 1, and the polishing apparatus starts polishing the workpiece W. During the polishing of the workpiece W, the processing system 49 produces a spectrum of reflected light from the workpiece W. Specifically, each time the polishing table 3 makes one rotation, the light source 44 emits the light to the workpiece W on the polishing pad 2 via the optical sensor head 7, the optical sensor head 7 receives the reflected light from the workpiece W, and the optical sensor head 7 transmits the reflected light to the spectrometer 47. The spectrometer 47 decomposes the reflected light from the workpiece W according to wavelengths, and measures the intensity of the reflected light at each of the wavelengths. The intensity measurement data of the reflected light is sent to the processing system 49. The processing system 49 generates a spectrum of the reflected light from the intensity measurement data of the reflected light. In the following description, the spectrum of the reflected light from the workpiece W will be referred to as measurement spectrum.

In step 2-2, the processing system 49 determines a feature of the measurement spectrum. The feature of the measurement spectrum is determined in the same manner as in the step 1-5 shown in FIG. 6.

In step 2-3, the processing system 49 calculates a similarity between the measurement spectrum and the representative spectrum determined in the above step 1-6.

In step 2-4, the processing system 49 inputs the feature of the measurement spectrum determined in the step 2-2 and the similarity calculated in the step 2-3 into the film-thickness estimation model, and outputs an estimated film thickness of the workpiece W from the film-thickness estimation model.

In step 2-5, the processing system 49 performs a smoothing process (for example, a moving average process) on the estimated film thickness obtained in the step 2-4. This step 2-5 may be omitted.

In step 2-6, the polishing controller 9 (see FIG. 1) determines a polishing end point at which the estimated film thickness reaches a predetermined target value.

In step 2-7, the polishing controller 9 instructs the polishing apparatus to terminate the polishing of the workpiece W.

According to the present embodiment, the film-thickness estimation model is created by the machine learning based on the features of the sample spectra. Therefore, the processing system 49 can estimate a film thickness from the relationship between a tendency of the sample spectra and a newly-obtained spectrum of the reflected light using the film-thickness estimation model. In the machine learning for creating the film-thickness estimation model, if a sample spectrum is affected by disturbance, difference in pattern structure, difference in an underlying structure of the film, etc., such a sample spectrum may be a factor that lowers the accuracy of machine learning. In one embodiment, the features may include the similarity to the representative spectrum and a confidence on the classification of the spectrum, so that the influence of such a sample spectrum can be reduced. Specifically, the film thickness estimation accuracy can be improved as compared with the machine learning using only the shape information of the sample spectrum.

The inventors compared an estimation of a film thickness using a film-thickness estimation model with features containing the similarity to one representative spectrum, with an estimation of a film thickness using a film-thickness estimation model with features that do not contain the similarity. As a result, the inventors have confirmed that an average of differences between actual film thicknesses and estimated film thicknesses was improved by 2.8%.

Figure 12:
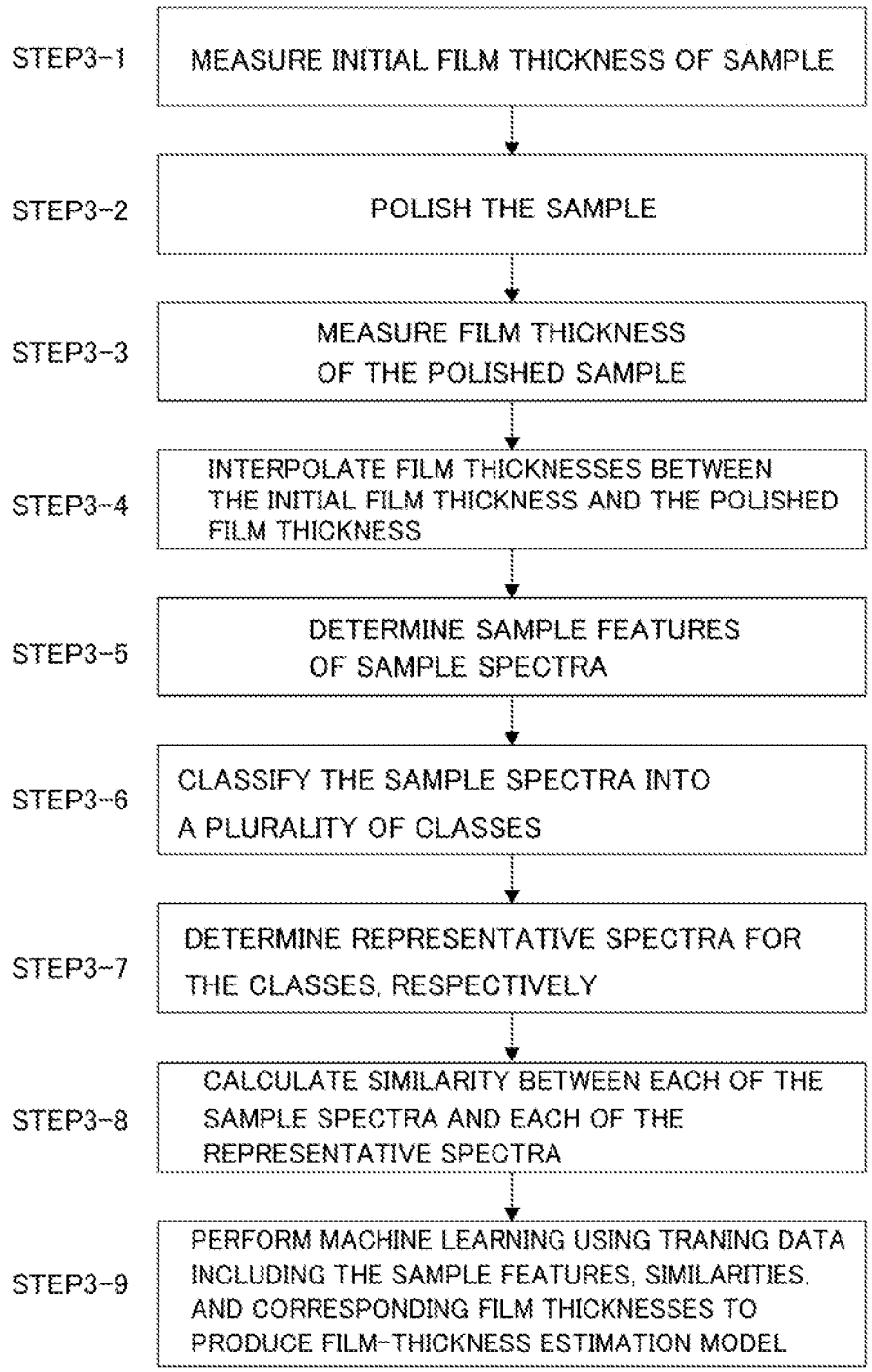
FIG. 12 is a flowchart illustrating another embodiment of a method of producing a film-thickness estimation model.

Next, another embodiment of a method of producing a film-thickness estimation model will be described with reference to a flowchart shown in FIG. 12. Since steps 3-1 to 3-5 shown in FIG. 12 are the same as the steps 1-1 to 1-5 shown in FIG. 6, repetitive descriptions thereof will be omitted.

In step 3-6, the processing system 49 classifies the sample spectra, generated during the polishing of the sample in the step 3-2, into classes according to shapes of the sample spectra. More specifically, the processing system 49 classifies the sample spectra into classes according to the shape by clustering. Examples of algorithm of the clustering include k-means, Gaussian Mixture Model (GMM), and DBSCAN. This step 3-6 may be performed before determining of the sample features, or may be performed after determining of the sample features.

In step 3-7, the processing system 49 determines representative spectra for the classes, respectively. For example, an average spectrum of sample spectra included in each class is determined to be the representative spectrum of that class. The determined representative spectra are stored in the memory 49a.

Figure 13:
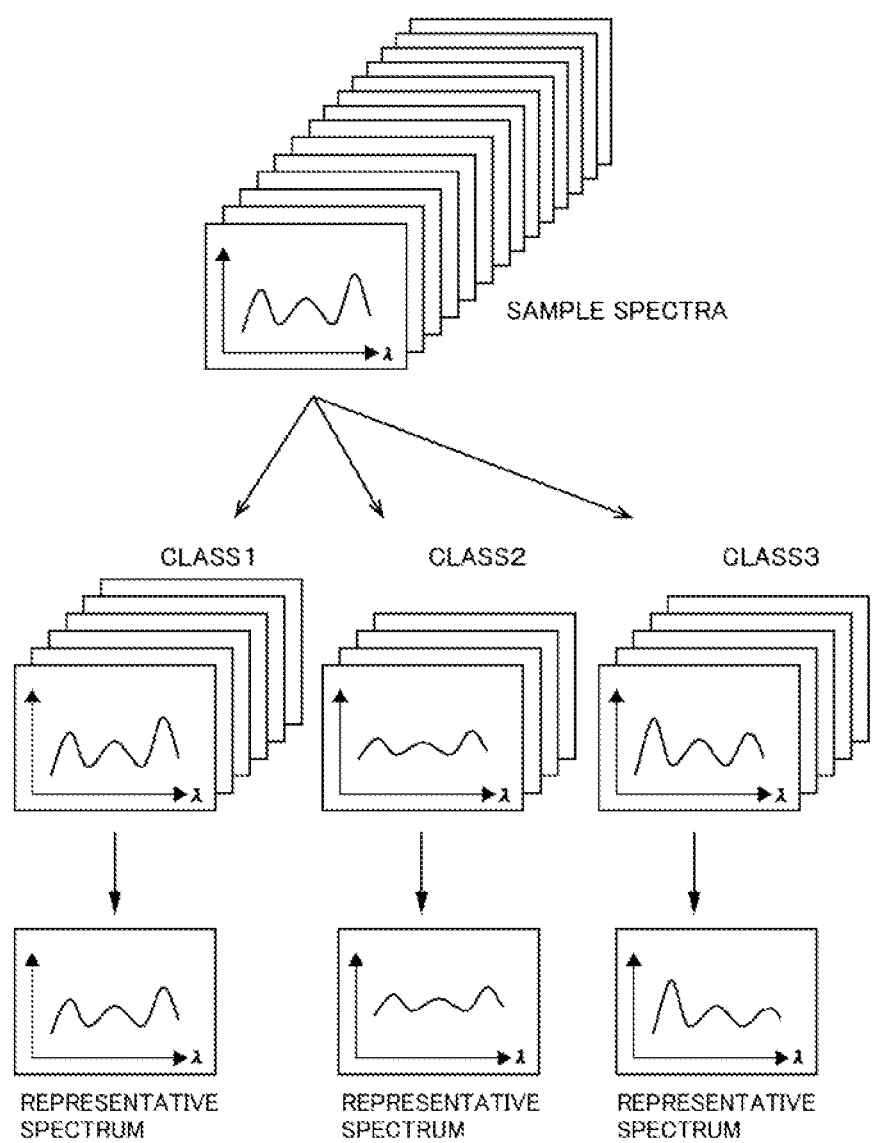
FIG. 13 is a diagram illustrating a step of classifying multiple sample spectra into classes and a step of determining a plurality of representative spectra for the plurality of classes, respectively.

FIG. 13 is a diagram illustrating the above step 3-6 for classifying the sample spectra into classes and the above step 3-7 for determining a representative spectrum for each of the classes. In the example shown in FIG. 13, sample spectra generated during polishing of a sample are classified into three classes. The sample spectra may be classified into two classes or four or more classes.

When an interconnect pattern is formed on a surface of the sample, the sample spectrum, which is the spectrum of the reflected light from the sample, varies depending on a reflection point of the light on the sample. For example, a sample spectrum of the reflected light from a device area (area with the interconnect pattern) has a shape significantly different from a shape of a sample spectrum of the reflected light from a scribe line (area with no interconnect pattern). Therefore, the sample spectra can be classified into classes according to the shape of each sample spectrum.

As shown in FIG. 13, the representative spectrum is determined for each class. In the example shown in FIG. 13, since the sample spectra are classified into three classes, three representative spectra are determined.

Referring back to FIG. 12, in step 3-8, the processing system 49 determines similarities by calculating a similarity between each of the sample spectra and each of the representative spectra. In the example shown in FIG. 13, each one of the sample spectra belonging to each class is compared with each of the three representative spectra, and similarities to the three representative spectra are calculated. In other words, three similarities are calculated for each sample spectrum.

In step 3-9, the processing system 49 produces or constructs the film-thickness estimation model by performing the machine learning using the training data that includes the sample features determined in the above step 3-5, the similarities calculated in the above step 3-8, and the film thicknesses corresponding respectively to the sample spectra determined in the above step 3-4.

Figure 14:
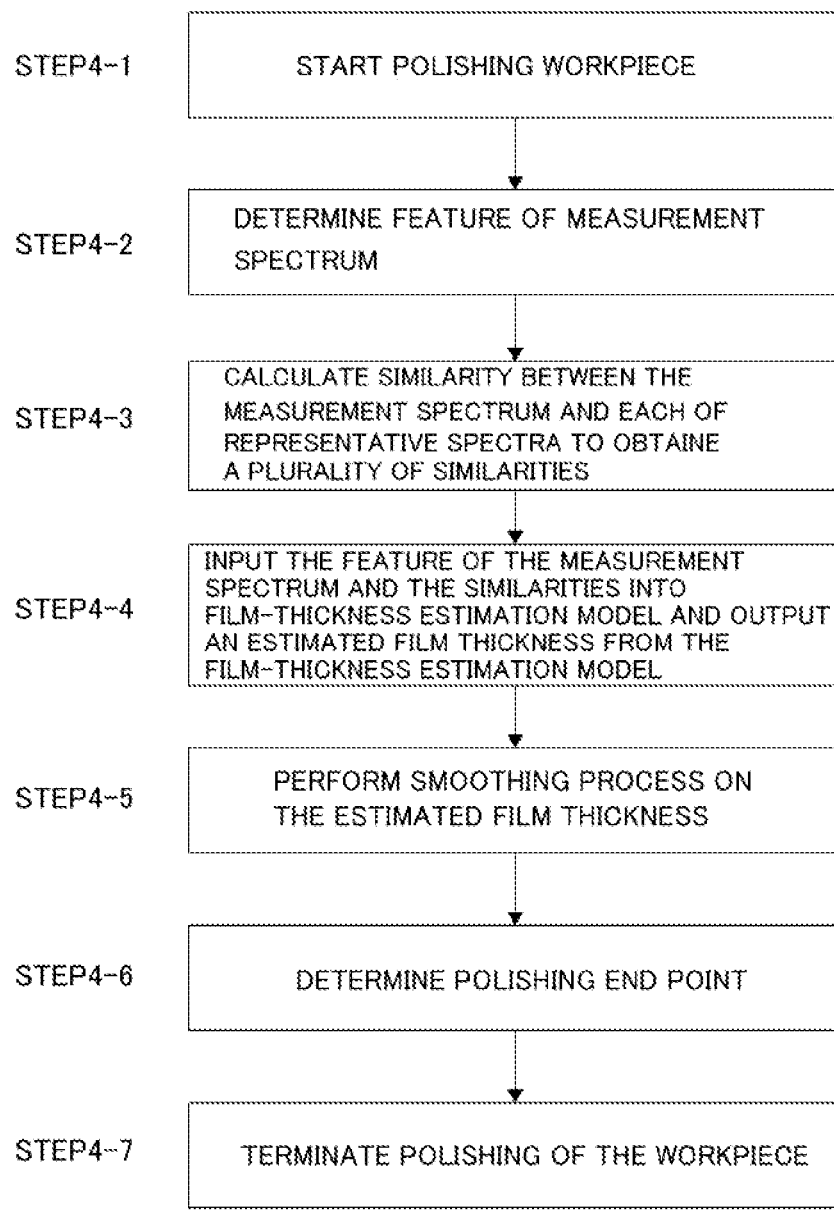
FIG. 14 is a flowchart illustrating an embodiment in which a film thickness of a workpiece is estimated during polishing of the workpiece using the film-thickness estimation model.

Next, an embodiment of estimating a film thickness of the workpiece W during polishing of the workpiece W using the film-thickness estimation model produced as described above will be described with reference to a flowchart of FIG. 14.

In step 4-1, the workpiece W is transported to the polishing apparatus shown in FIG. 1, and the polishing apparatus starts polishing the workpiece W. During the polishing of the workpiece W, the processing system 49 produces a spectrum of reflected light from the workpiece W. Specifically, each time the polishing table 3 makes one rotation, the light source 44 emits the light to the workpiece W on the polishing pad 2 via the optical sensor head 7, the optical sensor head 7 receives the reflected light from the workpiece W. and the optical sensor head 7 transmits the reflected light to the spectrometer 47. The spectrometer 47 decomposes the reflected light from the workpiece W according to wavelengths, and measures the intensity of the reflected light at each of the wavelengths. The intensity measurement data of the reflected light is sent to the processing system 49. The processing system 49 generates a spectrum of the reflected light, i.e., a measurement spectrum, from the intensity measurement data of the reflected light.

In step 4-2, the processing system 49 determines a feature of the measurement spectrum. The feature of the measurement spectrum is determined in the same manner as in the step 1-5 shown in FIG. 6. For example, the feature of the measurement spectrum is a set of numerical values indicating positions of peaks and valleys of the measurement spectrum (see FIG. 8). In another example, the feature of the measurement spectrum may be a set of numerical values representing positions of peaks and valleys of a Fourier analysis spectrum obtained by applying the Fourier transform to the measurement spectrum (see FIG. 9).

In step 4-3, the processing system 49 obtains similarities by calculating the similarity between the measurement spectrum and each of the representative spectra determined in the step 3-7.

In step 4-4, the processing system 49 inputs the feature of the measurement spectrum determined in the step 4-2 and the similarities calculated in the step 4-3 into the film-thickness estimation model, and outputs an estimated film thickness of the workpiece W from the film-thickness estimation model.

In step 4-5, the processing system 49 performs a smoothing process (for example, a moving average process) on the estimated film thickness obtained in the step 4-4. This step 4-5 may be omitted.

In step 4-6, the polishing controller 9 (see FIG. 1) determines a polishing end point at which the estimated film thickness reaches a predetermined target value.

In step 4-7, the polishing controller 9 instructs the polishing apparatus to terminate the polishing of the workpiece W.

Figure 15:
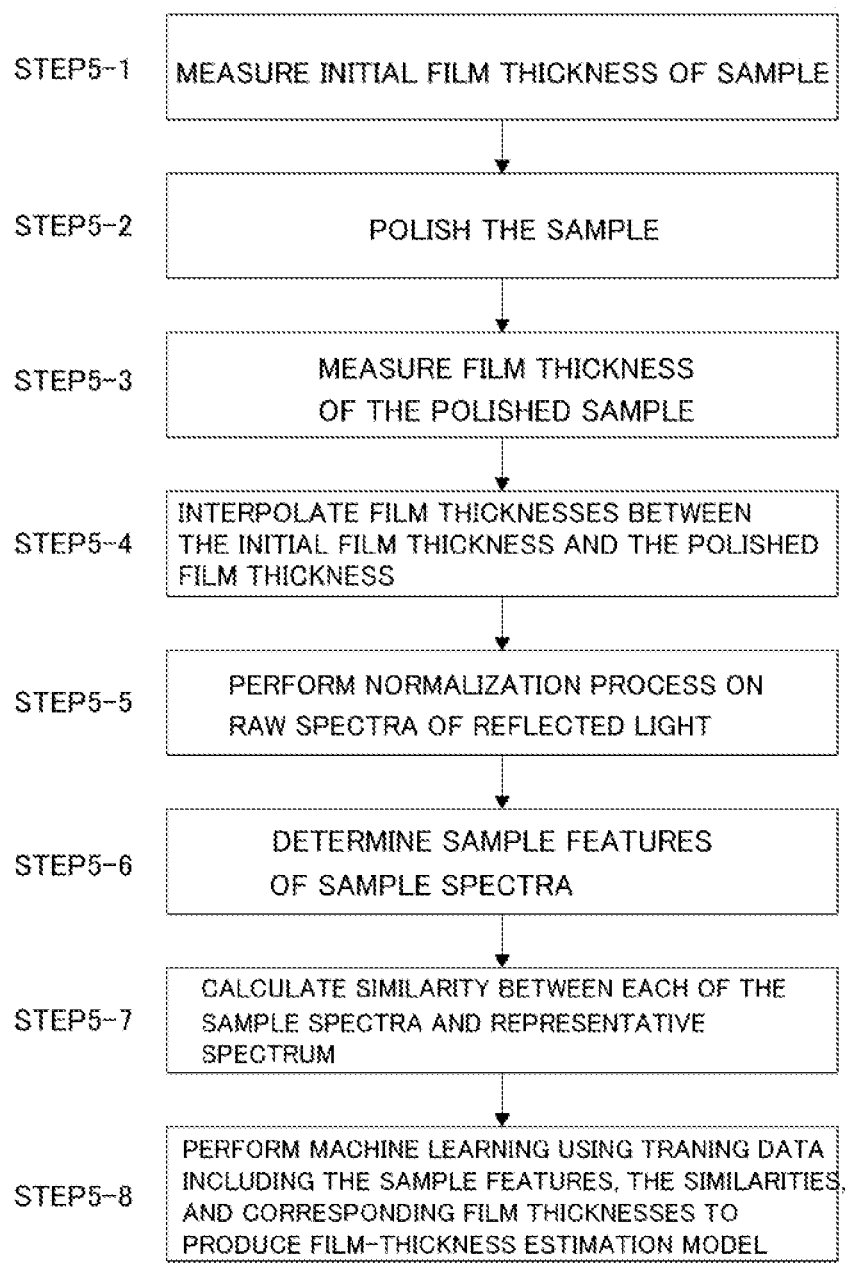
FIG. 15 is a flowchart illustrating still another embodiment of a method of producing a film-thickness estimation model.

Next, still another embodiment of a method of producing a film-thickness estimation model will be described with reference to a flowchart shown in FIG. 15. Since steps 5-1 to 5-4 shown in FIG. 15 are the same as the steps 1-1 to 1-4 shown in FIG. 6, repetitive descriptions thereof will be omitted.

In step 5-5, the processing system 49 performs a normalization process on raw spectra of the reflected lights from the sample. Therefore, each sample spectrum of this embodiment is a normalized spectrum. The normalization process is performed for the purpose of reducing a variation in the sample spectra and improving the accuracy of machine learning performed later. In particular, when a device area and a scribe line are present on the surface of the sample, reflected lights from the sample are likely to vary greatly. Therefore, the variation in the sample spectra can be reduced by the normalization process. As a result, the accuracy of machine leaning is improved, and the film-thickness estimation accuracy of the film-thickness estimation model is also improved.

Figure 16A:
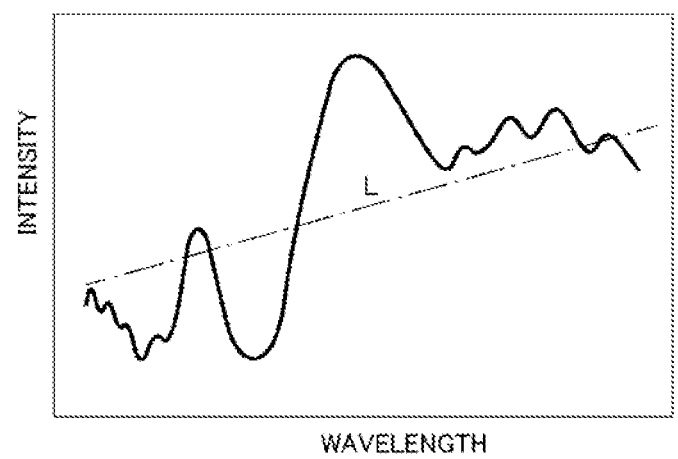
FIGS. 16A and 16B are diagrams illustrating a normalization process for adjusting a tilt of an entire raw spectrum.
Figure 16B:
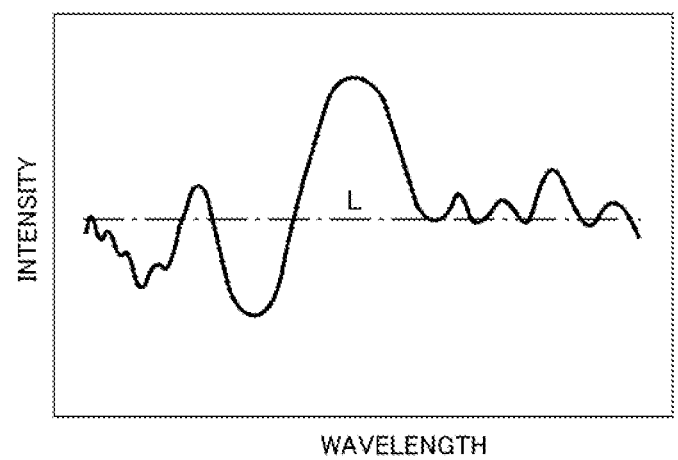

In one embodiment, the normalization process is a process of adjusting at least one of a tilt and a level of each raw spectrum in its entirety. FIGS. 16A and 16B are diagrams illustrating the normalization process for adjusting the tilt of the entire raw spectrum. As shown in FIG. 16A, the processing system 49 performs a linear regression on each of all raw spectra to determine regression lines L. Further, the processing system 49 adjusts all the raw spectra such that the regression lines L are horizontal, as shown in FIG. 16B.

Figure 17A:
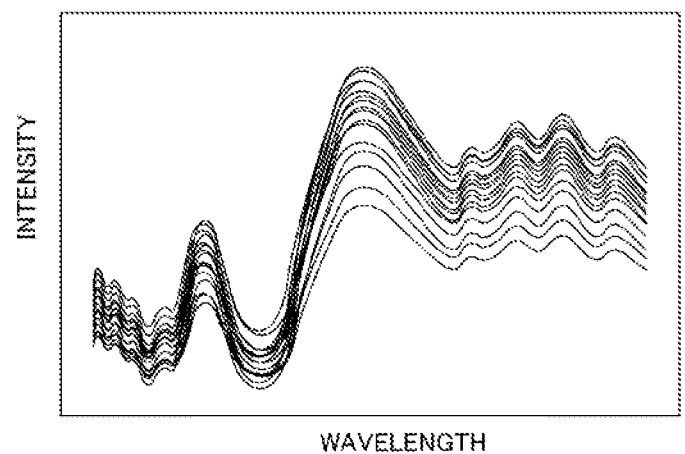
FIGS. 17A and 17B are diagrams illustrating a normalization process for adjusting a level of an entire raw spectrum.
Figure 17B:
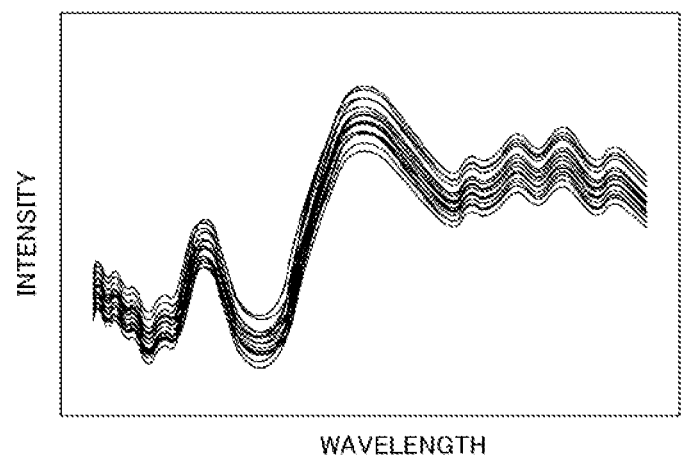

FIGS. 17A and 17B are diagrams illustrating the normalization process for adjusting the level of the raw spectrum in its entirety. More specifically, FIG. 17A shows raw spectra before the level adjustment, and FIG. 17B shows sample spectra obtained by the level adjustment of the raw spectra. As can be seen from the comparison between FIGS. 17A and 17B, as a result of the normalization process, the variation of the entire sample spectra is reduced.

The processing system 49 may perform both the tilt adjustment shown in FIG. 16B and the level adjustment shown in FIG. 17B. Such normalization process can reduce the tilt and/or the variation in the level (magnitude) of the sample spectra. As a result, the accuracy of the machine learning is improved, and the film-thickness estimation accuracy of the film-thickness estimation model is also improved.

Referring back to FIG. 15, in step 5-6, the processing system 49 determines sample features representing the features of the sample spectra, respectively. Each sample feature is determined in the same manner as in the step 1-5 shown in FIG. 6. For example, the sample feature is a set of numerical values indicating positions of peaks and valleys in the sample spectrum (see FIG. 8). In another example, the sample feature may be a set of numerical values representing positions of peaks and valleys in a Fourier analysis spectrum obtained by applying the Fourier transform to the sample spectrum (see FIG. 9).

In step 5-7, the processing system 49 obtains similarities by calculating the similarity between each of the sample spectra and a representative spectrum. The representative spectrum is determined before the calculation of the similarity. In one example, the representative spectrum is an average spectrum of the sample spectra. In another example, the representative spectrum is a spectrum of reflected light from the center of the sample. In yet another example, the representative spectrum may be an arbitrary one selected from the sample spectra, or may be a theoretical spectrum theoretically calculated from a film structure. The determined representative spectrum is stored in the memory 49a.

In step 5-8, the processing system 49 produces or constructs a film-thickness estimation model by performing machine learning using training data that includes the sample features determined in the step 5-6, the similarities calculated in the step 5-7, and the film thicknesses corresponding respectively to the sample spectra determined in the step 5-4.

Figure 18:
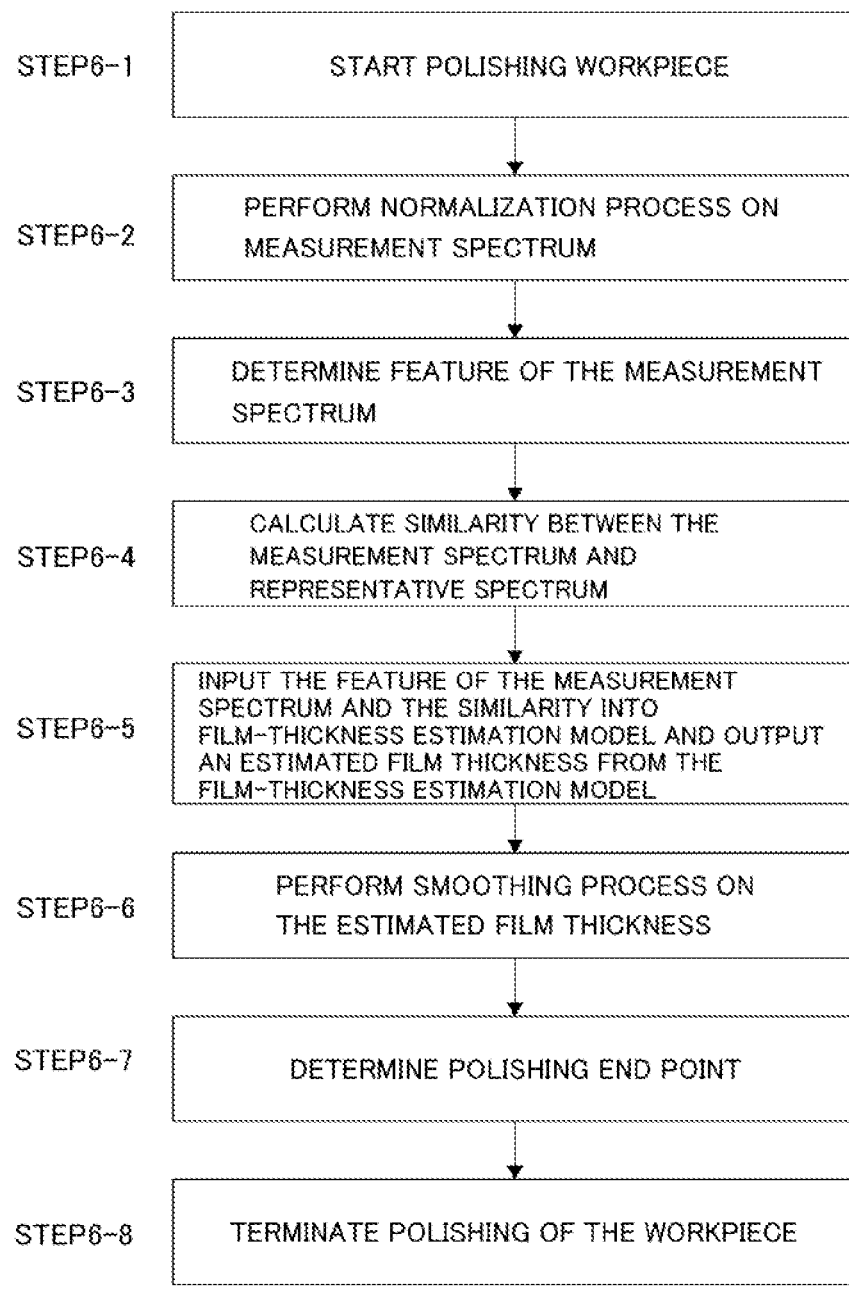
FIG. 18 is a flowchart illustrating an embodiment in which a film thickness of a workpiece is estimated during polishing of the workpiece using the film-thickness estimation model.

Next, an embodiment of estimating a film thickness of the workpiece W during polishing of the workpiece W using the film-thickness estimation model produced according to the flowchart shown in FIG. 15 will be described with reference to a flowchart of FIG. 18.

In step 6-1, the workpiece W is transported to the polishing apparatus shown in FIG. 1, and the polishing apparatus starts polishing the workpiece W. During the polishing of the workpiece W, the processing system 49 produces a spectrum of reflected light from the workpiece W. Specifically, each time the polishing table 3 makes one rotation, the light source 44 emits the light to the workpiece W on the polishing pad 2 via the optical sensor head 7, the optical sensor head 7 receives the reflected light from the workpiece W, and the optical sensor head 7 transmits the reflected light to the spectrometer 47. The spectrometer 47 decomposes the reflected light from the workpiece W according to wavelengths, and measures the intensity of the reflected light at each of the wavelengths. The intensity measurement data of the reflected light is sent to the processing system 49. The processing system 49 generates a spectrum of the reflected light, i.e., a measurement spectrum, from the intensity measurement data of the reflected light.

In step 6-2, the processing system 49 performs the normalization processing on the measurement spectrum. Therefore, the measurement spectrum obtained in the step 6-2 is a normalized spectrum. The normalization process is performed in the same manner as in the embodiments described with reference to FIGS. 15 to 17.

In step 6-3, the processing system 49 determines a feature of the measurement spectrum. The feature of the measurement spectrum is determined in the same manner as in the step 1-5 shown in FIG. 6. For example, the feature of the measurement spectrum is a set of numerical values indicating positions of peaks and valleys of the measurement spectrum (see FIG. 8). In another example, the feature of the measurement spectrum may be a set of numerical values representing positions of peaks and valleys of a Fourier analysis spectrum obtained by applying the Fourier transform to the measurement spectrum (see FIG. 9).

In step 6-4, the processing system 49 calculates a similarity between the measurement spectrum and the representative spectrum determined in the above step 5-7.

In step 6-5, the processing system 49 inputs the feature of the measurement spectrum determined in the step 6-3 and the similarity calculated in the step 6-4 into the film-thickness estimation model, and outputs an estimated film thickness of the workpiece W from the film-thickness estimation model.

In step 6-6, the processing system 49 performs a smoothing process (for example, a moving average process) on the estimated film thickness obtained in the step 6-5. This step 6-5 may be omitted.

In step 6-7, the polishing controller 9 (see FIG. 1) determines a polishing end point at which the estimated film thickness reaches a predetermined target value.

In step 6-8, the polishing controller 9 instructs the polishing apparatus to terminate the polishing of the workpiece W.

The embodiments including the normalization process described with reference to FIGS. 15 to 18 can be applied to the embodiments described with reference to FIGS. 12 to 14.

Figure 19:
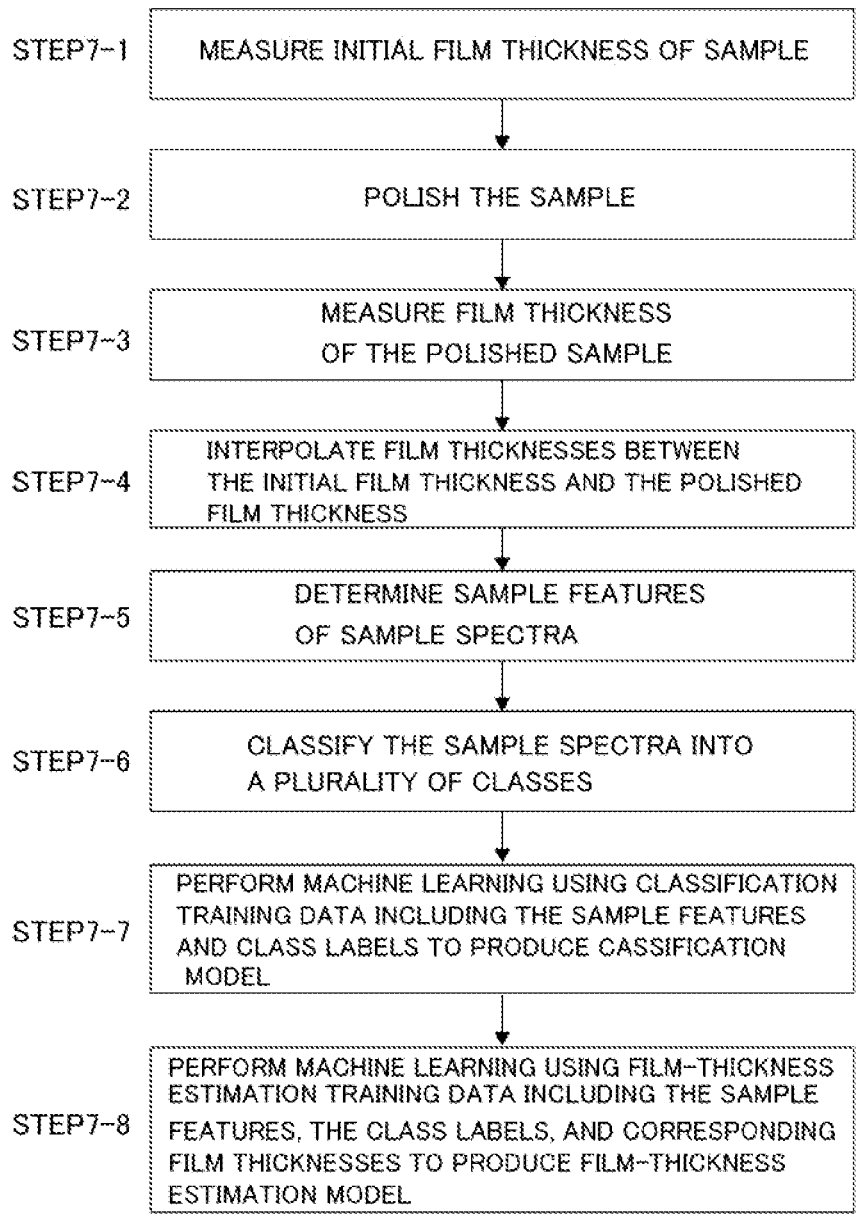
FIG. 19 is a flowchart illustrating still another embodiment of a method of producing a film-thickness estimation model.

Next, still another embodiment of a method of producing a film-thickness estimation model will be described with reference to a flowchart shown in FIG. 19. Since steps 7-1 to 7-5 shown in FIG. 19 are the same as the steps 1-1 to 1-5 shown in FIG. 6, repetitive descriptions thereof will be omitted.

In step 7-6, the processing system 49 classifies the sample spectra, produced during the polishing of the sample in the step 7-2, into classes according to shapes of the sample spectra. More specifically, the processing system 49 classifies the sample spectra into classes according to the shapes by clustering. Examples of algorithm of the clustering include k-means, Gaussian Mixture Model (GMM), and DBSCAN. This step 7-6 may be performed before determining of the sample features, or may be performed after determining of the sample features.

In step 7-7, the processing system 49 performs machine learning to produce a classification model using classification training data that includes the sample features and class labels each indicating a class to which each sample spectrum belongs. Each class label is a set of confidence scores to identify the class to which each sample spectrum belongs. The confidence scores that constitute each class label include a maximum value and a minimum value of the confidence scores. For example, when sample spectra are classified into a first class, a second class, and a third class, a class label for a sample spectrum belonging to the first class is "1, 0, 0", a class label for a sample spectrum belonging to the second class is "0, 1, 0", and a class label for a sample spectrum belonging to the third class is "0, 0, 1", where "1" is the maximum value of the confidence score, and "0" is the minimum value of the confidence score. The confidence score may be any numerical value between 0 and 1.

Examples of algorithm of the machine learning include a support vector regression method, a deep learning method, a random forest method, and a decision tree method. In this embodiment, the deep learning method, which is an example of machine learning, is used.

The classification model is composed of a neural network. The memory 49a of the processing system 49 stores a program for producing or constructing a classification model according to the machine learning algorithm. The arithmetic device 49b of the processing system 49 produces the classification model by performing arithmetic operations according to instructions included in the program. Producing the classification model by the machine learning involves optimizing parameters, such as weights, of the neural network.

The classification model is produced by the machine learning using the classification training data including the sample features and the class labels. More specifically, in the producing of the classification model, the multiple sample features contained in the classification training data are used as explanatory variables, and the multiple class labels included in the classification training data are used as objective variables (correct labels). Specifically, the processing system 49 inputs each sample feature to an input layer of the classification model, and adjusts the parameters (weights, bias, etc.) of the classification model such that an output layer of the classification model outputs a class label corresponding to the input sample feature. As a result of such machine learning, the classification model as a trained model is constructed. The classification model is stored in the memory 49a of the processing system 49.

In order to improve the accuracy of the classification model, it is preferable to prepare a large number of sample features and corresponding class labels. Therefore, multiple samples are prepared, and the steps 7-1 to 7-6 shown in FIG. 19 are repeated, so that a large number of sample features and corresponding class labels are obtained. The classification training data containing the combination of the sample features and the corresponding class labels produced in this way is stored in the database 60 of the memory 49a.

In step 7-8, the processing system 49 produces a film-thickness estimation model by performing the machine learning using film-thickness estimation training data that includes the sample features, the class labels, and the film thicknesses corresponding respectively to the sample spectra. More specifically, in the producing of the film-thickness estimation model, the sample features and the class labels included in the film-thickness estimation training data are used as explanatory variables, and the film thicknesses included in the film-thickness estimation training data are used as objective variables (correct labels). Specifically, the processing system 49 inputs each sample feature and each class label to the input layer of the film-thickness estimation model, and adjusts the parameters (weights, bias, etc.) of the film-thickness estimation mode such that the output layer of the film-thickness estimation model outputs a film thickness corresponding to the input sample feature and class label. As a result of such machine learning, the film-thickness estimation model as a trained model is constructed. The film-thickness estimation model is stored in the memory 49a of the processing system 49.

Figure 20:
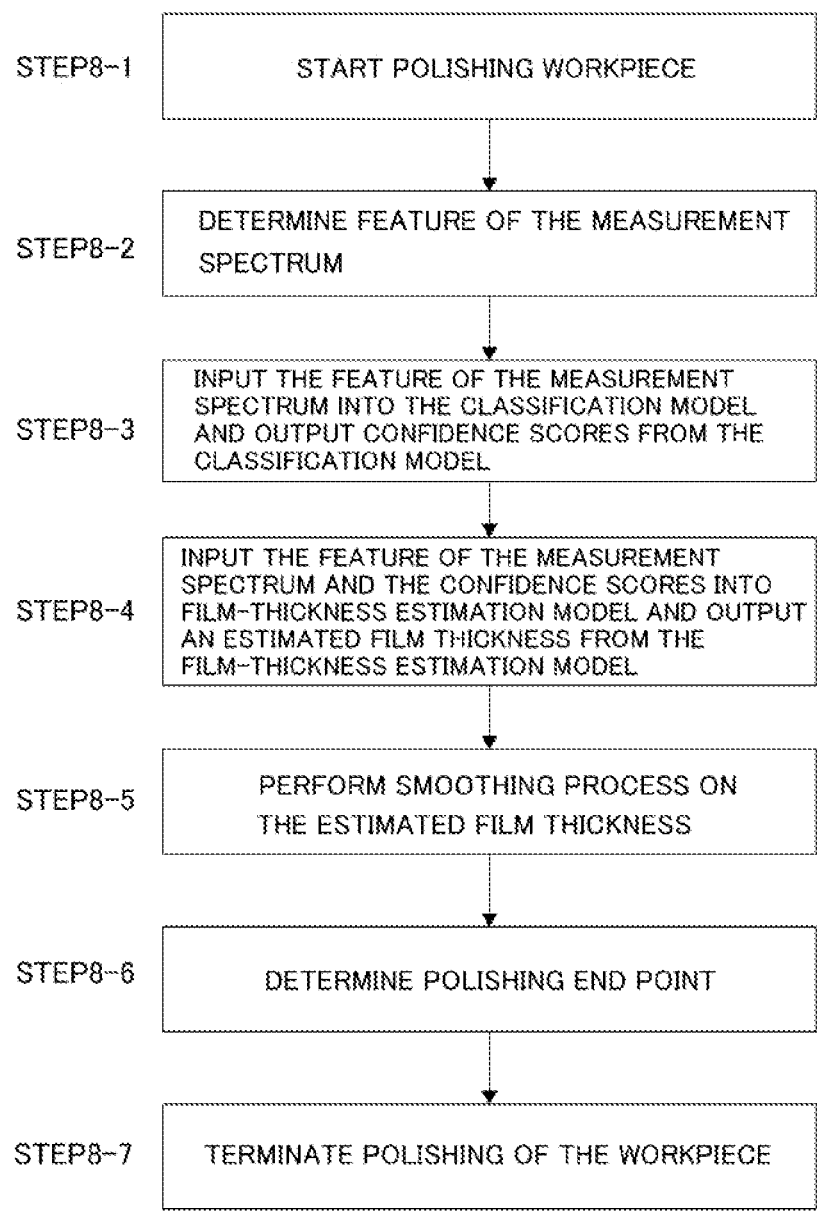
FIG. 20 is a flowchart illustrating an embodiment in which a film thickness of a workpiece is estimated during polishing of the workpiece using the film-thickness estimation model.

Next, an embodiment of estimating a film thickness of the workpiece W during polishing of the workpiece W using the classification model and the film-thickness estimation model produced according to the flowchart shown in FIG. 19 will be described with reference to a flowchart of FIG. 20.

In step 8-1, the workpiece W is transported to the polishing apparatus shown in FIG. 1, and the polishing apparatus starts polishing the workpiece W. During the polishing of the workpiece W, the processing system 49 produces a spectrum of reflected light from the workpiece W. Specifically, each time the polishing table 3 makes one rotation, the light source 44 emits the light to the workpiece W on the polishing pad 2 via the optical sensor head 7, the optical sensor head 7 receives the reflected light from the workpiece W, and the optical sensor head 7 transmits the reflected light to the spectrometer 47. The spectrometer 47 decomposes the reflected light from the workpiece W according to wavelengths, and measures the intensity of the reflected light at each of the wavelengths. The intensity measurement data of the reflected light is sent to the processing system 49. The processing system 49 generates a spectrum of the reflected light, i.e., a measurement spectrum, from the intensity measurement data of the reflected light.

In step 8-2, the processing system 49 determines a feature of the measurement spectrum. The feature of the measurement spectrum is determined in the same manner as in the step 1-5 shown in FIG. 6. For example, the feature of the measurement spectrum is a set of numerical values indicating positions of peaks and valleys of the measurement spectrum (see FIG. 8). In another example, the feature of the measurement spectrum may be a set of numerical values representing positions of peaks and valleys of a Fourier analysis spectrum obtained by applying the Fourier transform to the measurement spectrum (see FIG. 9).

In step 8-3, the processing system 49 inputs the feature of the measurement spectrum into the classification model, and outputs from the classification model a set of confidence scores indicating a class to which the measurement spectrum belongs. The set of confidence scores contain numerical values ranging from a minimum value to a maximum value of the confidence score. In one example, the set of confidence scores output from the classification model is (0.1, 0.1, 0.8).

In step 8-4, the processing system 49 inputs the feature of the measurement spectrum determined in the step 8-2 and the set of confidence scores calculated in the step 8-3 into the film-thickness estimation model, and outputs an estimated film thickness of the workpiece W from the film-thickness estimation model.

In step 8-5, the processing system 49 performs a smoothing process (for example, a moving average process) on the estimated film thickness obtained in the step 8-4. This step 8-5 may be omitted.

In step 8-6, the polishing controller 9 (see FIG. 1) determines a polishing end point at which the estimated film thickness reaches a predetermined target value.

In step 8-7, the polishing controller 9 instructs the polishing apparatus to terminate the polishing of the workpiece W.

The embodiments including the normalization process described with reference to FIGS. 15 to 18 can be applied to the embodiments described with reference to FIGS. 19 and 20. Hereinafter, an embodiment in which the normalization process is applied to the embodiments of FIGS. 19 and 20 will be described.

Figure 21:
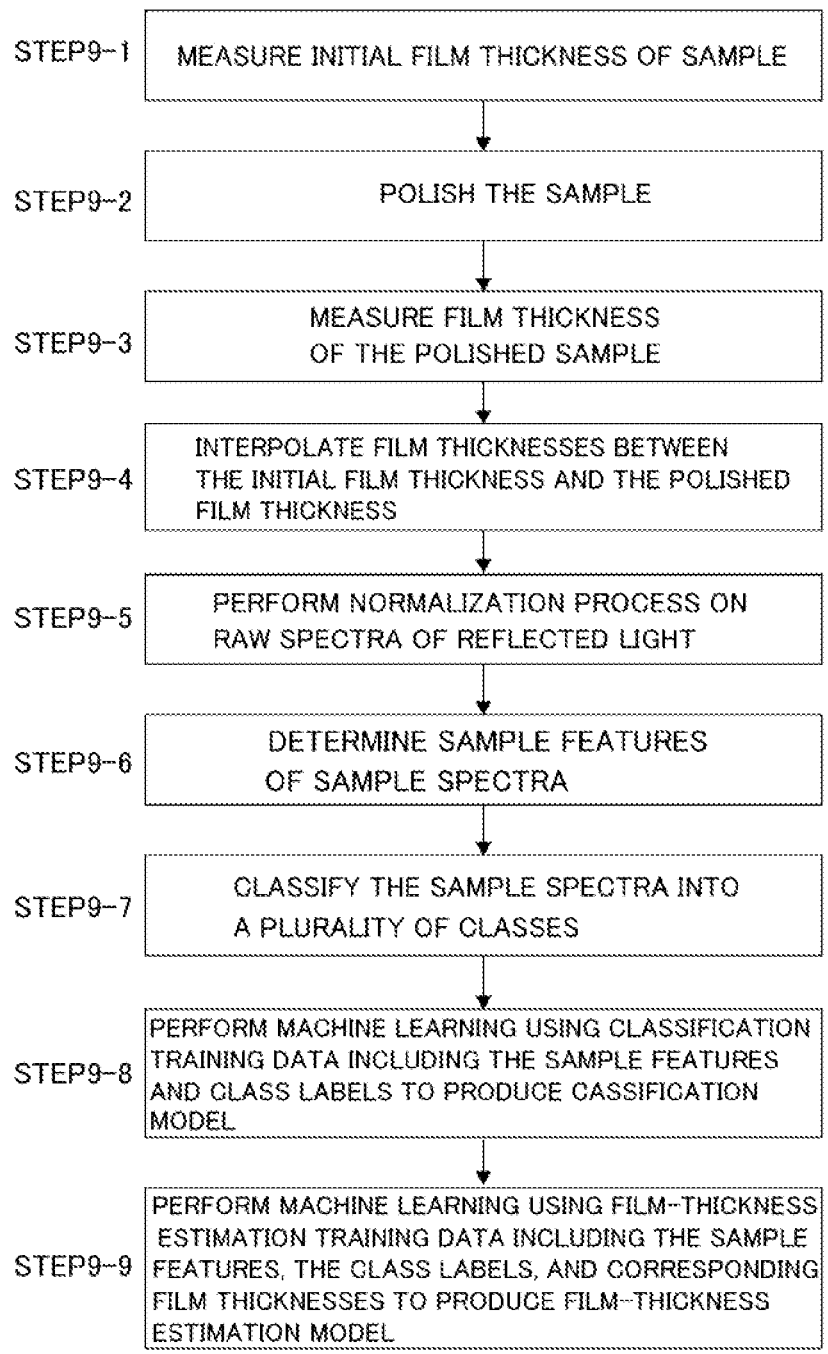
FIG. 21 is a flowchart illustrating still another embodiment of a method of producing a film-thickness estimation model.

FIG. 21 is a flowchart showing still another embodiment of a method of producing a film-thickness estimation model. Since steps 9-1 to 9-4 shown in FIG. 21 are the same as the steps 1-1 to 1-4 shown in FIG. 6, repetitive descriptions thereof will be omitted.

In step 9-5, the processing system 49 performs the normalization process on the raw spectra of the reflected lights from the sample. Therefore, each sample spectrum of this embodiment is a normalized spectrum. The normalization process is performed in the same manner as in the embodiments described with reference to FIGS. 15 to 17.

In step 9-6, the processing system 49 determines sample features representing the features of the sample spectra. Each sample feature is determined in the same manner as in step 1-5 shown in FIG. 6. For example, the sample feature is a set of numerical values indicating the positions of peaks and valleys in the sample spectrum (see FIG. 8). In another example, the sample feature may be a set of numerical values representing the positions of peaks and valleys in the Fourier analysis spectrum obtained by applying the Fourier transform to the sample spectrum (see FIG. 9).

In step 9-7, the processing system 49 classifies the sample spectra generated during the polishing of the sample in the step 9-2 into classes according to the shape. More specifically, the processing system 49 classifies the sample spectra into classes according to the shape by clustering. This step 9-7 may be performed before determining of the sample features, or may be performed after determining of the sample features.

In step 9-8, the processing system 49 performs machine learning to produce the classification model using the classification training data including the sample features and the class labels indicating the classes to which the sample spectra belong.

In step 9-9, the processing system 49 produces the film-thickness estimation model by performing machine learning using the film-thickness estimation training data including the class labels, the sample features, and the film thicknesses corresponding respectively to the sample spectra.

Figure 22:
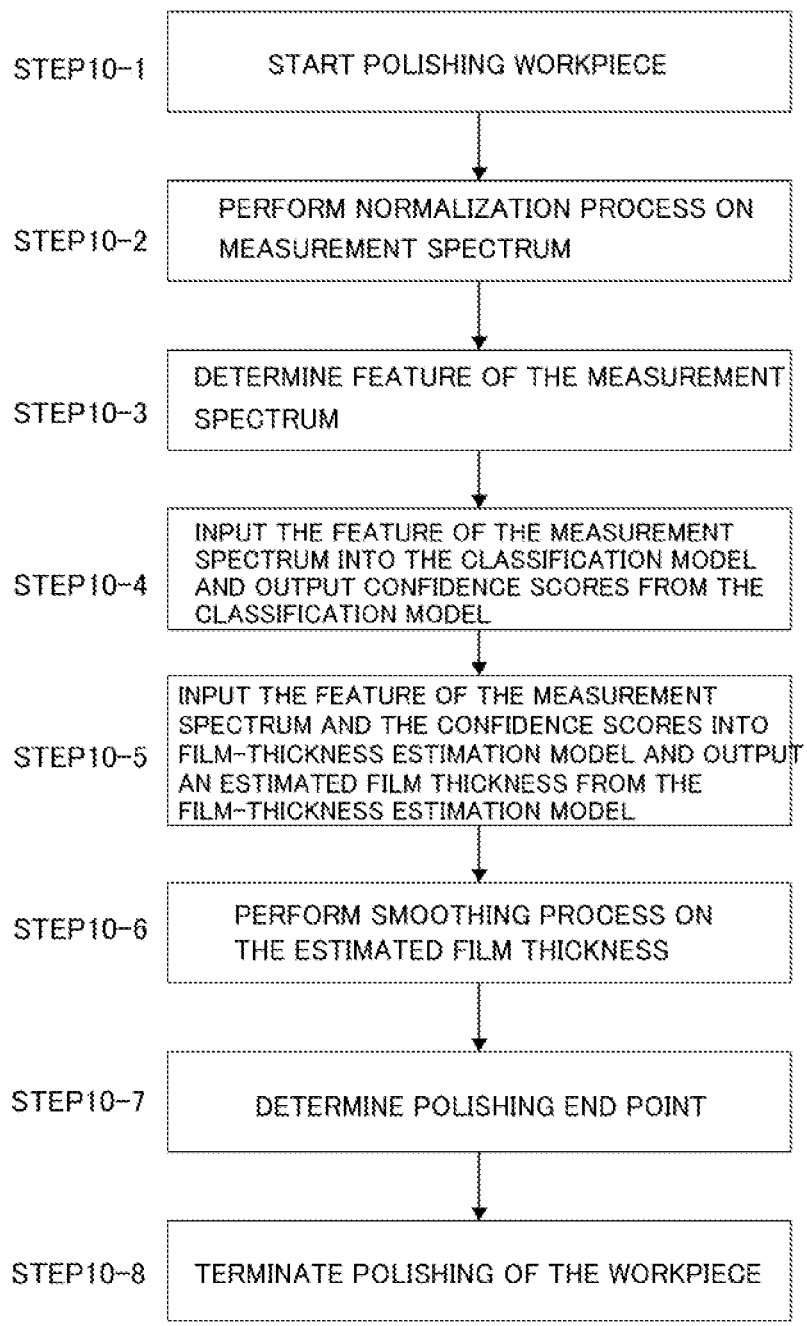
FIG. 22 is a flowchart illustrating an embodiment in which a film thickness of a workpiece is estimated during polishing of the workpiece using the film-thickness estimation model.
Figure 23:
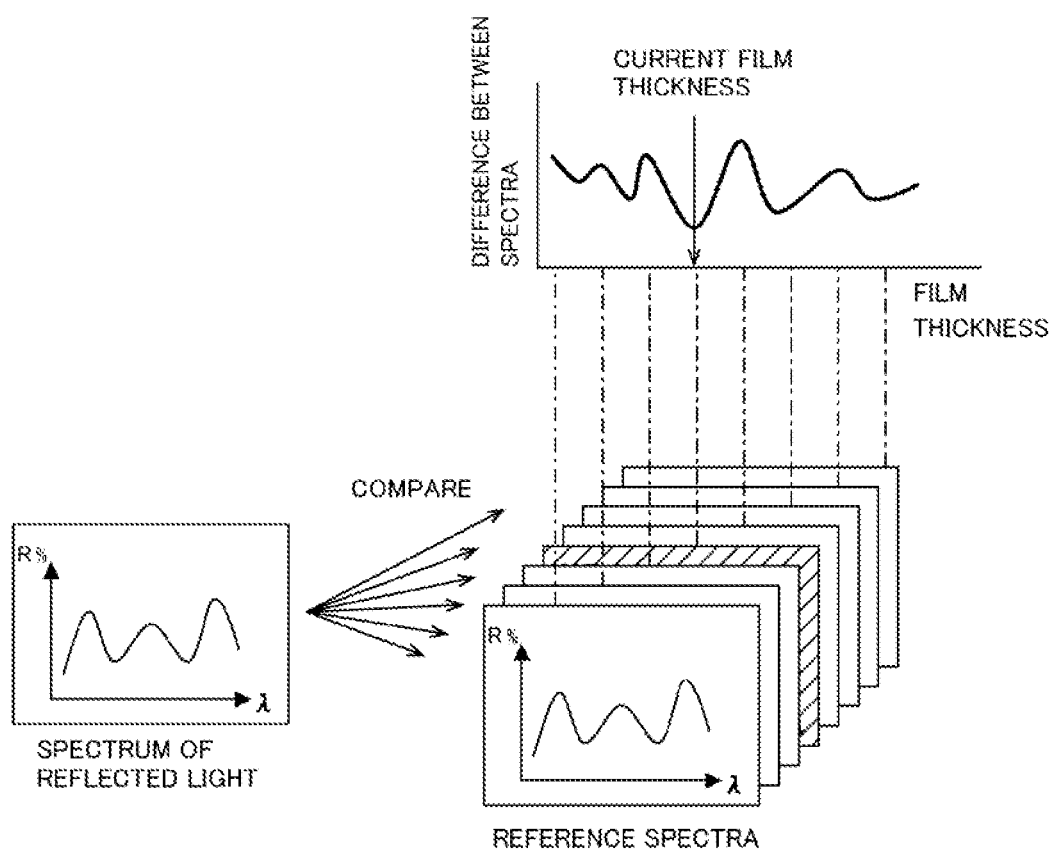
FIG. 23 is a diagram illustrating an example of a conventional method of determining a film thickness from a spectrum of reflected light.

Next, an embodiment of estimating a film thickness of the workpiece W during polishing of the workpiece W using the classification model and the film-thickness estimation model produced according to the flowchart shown in FIG. 21 will be described with reference to a flowchart of FIG. 22.

In step 10-1, the workpiece W is transported to the polishing apparatus shown in FIG. 1, and the polishing apparatus starts polishing the workpiece W. During the polishing of the workpiece W, the processing system 49 produces a spectrum of reflected light from the workpiece W. Specifically, each time the polishing table 3 makes one rotation, the light source 44 emits the light to the workpiece W on the polishing pad 2 via the optical sensor head 7, the optical sensor head 7 receives the reflected light from the workpiece W, and the optical sensor head 7 transmits the reflected light to the spectrometer 47. The spectrometer 47 decomposes the reflected light from the workpiece W according to wavelengths, and measures the intensity of the reflected light at each of the wavelengths. The intensity measurement data of the reflected light is sent to the processing system 49. The processing system 49 generates a spectrum of the reflected light, i.e., a measurement spectrum, from the intensity measurement data of the reflected light.

In step 10-2, the processing system 49 performs normalization processing on the measurement spectrum. Therefore, the measurement spectrum obtained in step 10-2 is a normalized spectrum. The normalization process is performed in the same manner as in the embodiments described with reference to FIGS. 15 to 17.

In step 10-3, the processing system 49 determines a feature of the measurement spectrum. The feature of the measurement spectrum is determined in the same manner as in the step 1-5 shown in FIG. 6. For example, the feature of the measurement spectrum is a set of numerical values indicating positions of peaks and valleys of the measurement spectrum (see FIG. 8). In another example, the feature of the measurement spectrum may be a set of numerical values representing positions of peaks and valleys of a Fourier analysis spectrum obtained by applying the Fourier transform to the measurement spectrum (see FIG. 9).

In step 10-4, the processing system 49 inputs the feature of the measurement spectrum into the classification model, and outputs from the classification model a set of confidence scores indicating a class to which the measurement spectrum belongs. In one example, the set of confidence scores output from the classification model is (0.1, 0.1, 0.8).

In step 10-5, the processing system 49 inputs the feature of the measurement spectrum determined in the step 10-3 and the set of confidence scores calculated in the step 10-4 into the film-thickness estimation model, and outputs an estimated film thickness of the workpiece W from the film-thickness estimation model.

In step 10-6, the processing system 49 performs a smoothing process (for example, a moving average process) on the estimated film thickness obtained in the step 10-5. This step 10-6 may be omitted.

In step 10-7, the polishing controller 9 (see FIG. 1) determines a polishing end point at which the estimated film thickness reaches a predetermined target value.

In step 10-8, the polishing controller 9 instructs the polishing apparatus to terminate the polishing of the workpiece W.

The steps in the flowchart of each of the embodiments discussed so far are performed by the processing system 49. Specifically, the processing system 49 operates according to the instructions included in the programs electrically stored in the memory 49a, and performs the above steps in the above embodiments. The programs for causing the processing system 49 to perform these steps are stored in a computer-readable storage medium which is a non-transitory tangible medium, and is provided to the processing system 49 via the storage medium. Alternatively, the programs may be input to the processing system 49 via a communication network, such as the Internet or a local area network.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments. Therefore, the present invention is not intended to be limited to the embodiments described herein but is to be accorded the widest scope as defined by limitation of the claims.

What is claimed is:

1. A method for chemical mechanical processing of a sample having a film, the method comprising:
   determine sample features representing features of sample spectra of reflected lights from the sample having a film;
   before or after determining of the sample features, classifying the sample spectra into classes according to a clustering algorithm;
   producing a classification model by performing machine learning using classification training data including the sample features and class labels each indicating a class to which each sample spectrum belongs, the sample features contained in the classification training data being used as explanatory variables in the machine learning, and the class labels included in the classification training data being used as objective variables in the machine learning; and
   producing a film-thickness estimation model by performing machine learning using film thickness estimation training data including the sample features, the class labels, and film thicknesses corresponding to the sample spectra.

2. The method according to claim 1, wherein each of the sample features includes a numerical value representing shape of each sample spectrum.

3. The method according to claim 1, wherein each of the sample features includes a numerical value representing a shape of a Fourier analysis spectrum obtained by applying a Fourier transform to each sample spectrum.

4. The method according to claim 1, wherein the sample spectra are spectra obtained by performing a normalization process on raw spectra of reflected lights from the sample.

5. The method according to claim 4, wherein the normalization process is a process of adjusting at least one of tilt and level of each raw spectrum in its entirety.

6. A film thickness estimation method for chemical mechanical processing of a workpiece having a film comprising:
   producing a measurement spectrum of reflected light from the workpiece, while polishing the workpiece;
   determining a feature of the measurement spectrum;
   inputting the feature of the measurement spectrum into a classification model produced by performing machine learning using classification training data including the sample features and class labels each indicating a class to which each sample spectrum belongs, the sample features contained in the classification training data being used as explanatory variables in the machine learning, and the class labels included in the classification training data being used as objective variables in the machine learning;
   outputting confidence scores from the classification model, the confidence scores indicating a class to which the measurement spectrum belongs;
   inputting the feature of the measurement spectrum and the confidence scores into a film-thickness estimation model produced by performing machine learning using film thickness estimation training data including the sample features, the class labels, and film thicknesses corresponding to the sample spectra; and
   outputting an estimated film thickness of the workpiece from the film-thickness estimation model.

7. A non-transitory computer-readable storage medium that stores a program for chemical mechanical processing of a sample having a film, the program configured to cause a computer to perform the steps of:
   determine sample features representing features of sample spectra of reflected lights from the sample;
   before or after determining of the sample features, classifying the sample spectra into classes according to algorithm of clustering;
   producing a classification model by performing machine learning using classification training data including the sample features and class labels each indicating a class to which each sample spectrum belongs, the sample features contained in the classification training data being used as explanatory variables in the machine learning, and the class labels included in the classification training data being used as objective variables in the machine learning; and
   producing a film-thickness estimation model by performing machine learning using film thickness estimation training data including the sample features, the class labels, and film thicknesses corresponding to the sample spectra.

8. A non-transitory computer-readable storage medium that stores a program for chemical mechanical processing of a workpiece having a film, the program configured to cause a computer to perform the steps of:
   producing a measurement spectrum of reflected light from the workpiece;
   determining a feature of the measurement spectrum;
   inputting the feature of the measurement spectrum into a classification model produced by performing machine learning using classification training data including the sample features and class labels each indicating a class to which each sample spectrum belongs, the sample features contained in the classification training data being used as explanatory variables in the machine learning, and the class labels included in the classification training data being used as objective variables in the machine learning;
   outputting confidence scores from the classification model, the confidence scores indicating a class to which the measurement spectrum belongs;
   inputting the feature of the measurement spectrum and the confidence scores into the film-thickness estimation model produced by performing machine learning using film thickness estimation training data including the sample features, the class labels, and film thicknesses corresponding to the sample spectra; and outputting an estimated film thickness of the workpiece from the film-thickness estimation model.

\* \* \* \* \*